(12) United States Patent
Uppili et al.

(10) Patent No.: US 10,554,718 B2
(45) Date of Patent: Feb. 4, 2020

(54) SYSTEMS AND METHODS FOR PROVIDING IMPROVED QUALITY OF EXPERIENCE FOR MEDIA CONTENT CONSUMPTION

(71) Applicant: Tambora Systems Singapore Pte. Ltd., Singapore (SG)

(72) Inventors: Anand Uppili, Bangalore (IN); Pothirajan Kandasamy, Bangalore (IN); Ganesh Ramachandran Vaidyanathan, Bangalore (IN); Raghu Govardhana, Bangalore (IN); Mahesh Chindi, Bangalore (IN)

(73) Assignee: Tambora Systems Singapore Pte. Ltd., Singapore (SG)

( * ) Notice: Subject to any disclaimer, the term of this patent is extended or adjusted under 35 U.S.C. 154(b) by 340 days.

(21) Appl. No.: 15/385,594

(22) Filed: Dec. 20, 2016

(65) Prior Publication Data

US 2018/0115594 A1    Apr. 26, 2018

(30) Foreign Application Priority Data

Oct. 21, 2016 (IN) .............................. 201641036015

(51) Int. Cl.
*H04L 29/06* (2006.01)
*H04L 29/12* (2006.01)

(52) U.S. Cl.
CPC ............ *H04L 65/80* (2013.01); *H04L 61/106* (2013.01); *H04L 61/2514* (2013.01); *H04L 61/605* (2013.01); *H04L 63/0823* (2013.01); *H04L 65/605* (2013.01)

(58) Field of Classification Search
CPC .... G06F 15/16; G06F 17/2235; G06F 17/241; H04L 65/4084; H04L 65/1059; H04L 65/4092
USPC ................................................. 709/219, 231
See application file for complete search history.

(56) References Cited

U.S. PATENT DOCUMENTS

| | | | | | |
|---|---|---|---|---|---|
| 7,861,097 | B2 * | 12/2010 | Smeets | ................. | G06F 21/602 713/194 |
| 8,611,919 | B2 * | 12/2013 | Barnes, Jr. | ......... | G06Q 10/1053 455/456.1 |
| 8,732,778 | B1 * | 5/2014 | Shen | .................... | H04N 21/236 725/98 |

(Continued)

*Primary Examiner* — Tesfay Yohannes
(74) *Attorney, Agent, or Firm* — Fiala & Weaver P.L.L.C.

(57) ABSTRACT

Embodiments described herein are related to providing an improved quality of experience (QoE) for users consuming video content. An improved QoE may be provided to a user by allocating an appropriate bandwidth at which content is provided to the user. The appropriate bandwidth may be determined by an application function of the communications network used to provide the content to the user. The application function analyzes messages received from the content provider to determine characteristics of the content, determines the appropriate bandwidth accordingly, and generates a policy control rule to be enforced by the communications network when transmitting the content. Alternatively, a mobile device used to engage in the content determines the appropriate bandwidth at which video is to be transmitted thereto. The determined bandwidth is provided to the application function, which generates a policy control rule to be enforced by the communications network based on the determined bandwidth.

23 Claims, 11 Drawing Sheets

(56) References Cited

U.S. PATENT DOCUMENTS

| | | | |
|---|---|---|---|
| 8,788,695 B2* | 7/2014 | Fox | G06F 15/781 |
| | | | 709/231 |
| 9,137,125 B1* | 9/2015 | Doronichev | H04L 41/509 |
| 9,363,539 B2* | 6/2016 | Das | H04N 21/4223 |
| 9,432,478 B2* | 8/2016 | Gibbon | H04W 4/029 |
| 9,769,415 B1* | 9/2017 | Buchheit | H04N 5/50 |
| 10,172,062 B2* | 1/2019 | Halepovic | H04W 4/029 |
| 10,231,159 B2* | 3/2019 | Chakraborty | H04W 36/14 |
| 2015/0149591 A1* | 5/2015 | Gibbon | H04W 4/029 |
| | | | 709/219 |
| 2018/0115594 A1* | 4/2018 | Uppili | H04L 65/80 |

* cited by examiner

SYSTEMS AND METHODS FOR PROVIDING IMPROVED QUALITY OF EXPERIENCE FOR MEDIA CONTENT CONSUMPTION

CROSS-REFERENCE TO RELATED APPLICATION(S)

This application claims priority to Indian Patent Application No. 201641036015, filed on Oct. 21, 2016, the entirety of which is incorporated by reference herein.

BACKGROUND

Technical Field

The present invention relates to systems and methods for improving the quality of experience for a user when consuming media content.

Background Art

By the end of 2016, global internet protocol (IP) traffic will reach 1.1. zettabytes (ZB) per year, or 88.7 exabytes (EB) per month. By the year 2020, global IP traffic will reach 2.3 ZB per year, or 194 EB per month. As mobile devices continue to evolve, so will the consumer appetite for higher definition video. In this regard, trends show that wireless and mobile devices will account for two-thirds of global IP traffic by 2020. Thus, operators are faced with the challenge of providing a satisfactory Quality of Experience (QoE) for an ever-growing number of mobile users that are wanting to watch more and more video.

BRIEF SUMMARY

Methods, systems, and apparatuses are described for improving the quality of experience for a user when consuming media content, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Introduction

Figure 1:
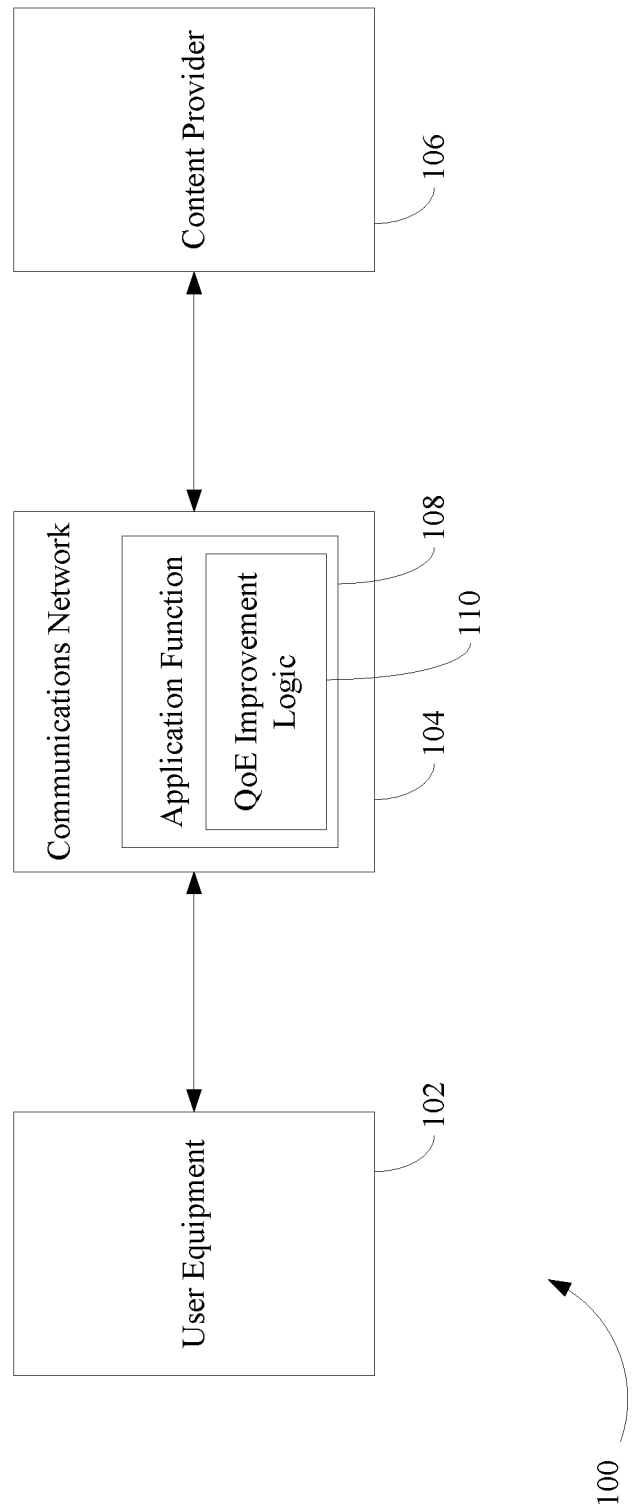
FIG. 1 is a block diagram of a system that is configured to provide an improved QoE for media content consumption to one or more users of a communications network in accordance with an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down,"

"top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that any section/subsection headings used herein are not intended to be limiting. Embodiments described in this document may be eligible for inclusion within multiple different sections or subsections. Furthermore, disclosed embodiments may be combined with each other in any manner.

A method is described herein that is implemented by a device intermediate to a mobile device and a content provider. In accordance with the method, a request for video content is received from the mobile device. The request is provided to the content provider. A trigger message is received from the content provider. A determination is made as to whether the trigger message includes information regarding the video content. In response to determining that the trigger message includes the information, a first bandwidth at which the video content is to be provided to the mobile device based on the information is determined. In response to determining that the trigger message does not include the information, a second bandwidth at which the video content is to be provided to the mobile device is determined, the second bandwidth being a default bandwidth.

A system is also described herein. The system includes one or more processing units and a memory coupled to the processing unit(s). The memory stores instructions, which, when executed by the processing unit(s), cause the processing unit(s) to perform operations. In accordance with the operations, a request for video content is received from the mobile device via a mobile network. The request is provided to the content provider. A trigger message is received from the content provider. A determination is made as to whether the trigger message includes information regarding the video content. In response to determining that the trigger message includes the information, a first bandwidth at which the video content is to be provided to the mobile device based on the information is determined. In response to determining that the trigger message does not include the information, a second bandwidth at which the video content is to be provided to the mobile device is determined, the second bandwidth being a default bandwidth.

A method implemented by a mobile device is also described herein. In accordance with the method, a first portion of video content is received from a content provider via a network. A recommended bit rate at which remaining portions of the video content are to be provided to the mobile device via the network is determined based on a number of bytes to be downloaded for the remaining portions of the video content and a video duration time of the remaining portions of the video content. The recommended bit rate is provided, via the network, to an application server coupled between the mobile device and the content provider.

Example Embodiments

Techniques described here are related to providing an improved QoE for users consuming media content, such as video content. An improved QoE may be provided to a user by allocating an appropriate bandwidth at which media content is provided to the user. In accordance with an embodiment, the appropriate bandwidth may be determined by a node of the communications network that is used to provide the media content to the user. The node may be an application function that analyzes messages received from the content provider to determine characteristics of the video content being transmitted to the user. Based on the characteristics, the application function determines the appropriate bandwidth at which the video content is to be transmitted to the user and generates a policy control rule that is to be enforced by the communications network when transmitting the media content. In accordance with another embodiment, user equipment (e.g., a mobile device) used by a user to consume media content may execute a software application that determines an appropriate bandwidth at which video is to be transmitted thereto. The determined bandwidth may be provided to the application function, which generates a policy control rule to be enforced by the communications network based on the determined bandwidth.

Subsection A describes embodiments in which the bandwidth determination is performed by the application function. Subsection B describes embodiments in which the bandwidth determination is performed by user equipment.

A. Bandwidth Determination by an Application Function

FIG. 1 is a block diagram of a system 100 that is configured to provide an improved QoE for media content consumption to one or more users of a communications network 104 in accordance with an embodiment. As shown in FIG. 1, system 100 includes user equipment 102, communications network 104 and a content provider 106. Communications network 104 may comprise a wireless cellular network. The wireless cellular network may be configured to operate in accordance with a 3rd Generation Partnership Project (3GPP)-based system. Examples of 3GPP-based systems include, but are not limited to a Long Term Evolution (LTE) network, a Universal Mobile Telecommunications System (UMTS), an Evolution-Data Optimized (EV-DO)-based network, etc.

User equipment 102 may comprise any device that is configured to communicate with content provider 106 via communications network 104. User equipment 102 may be configured to transmit one or more requests for media content to content provider 106 via communications network 104. Examples of user equipment 102 include a smart phone, a tablet, a laptop computer, a wearable device, and/or any other device that is configured to communicate via a wireless cellular network.

Content provider 106 may comprise a content-providing source configured to provide media content (e.g., audio content, video content, etc.) to user equipment 102 via communications network 104. For example, content provider 106 may comprise one or more servers configured to provide video content to user equipment 102 via communication network 104. Video content providing services that may be implemented via content provider 106 may include, but are not limited to YouTube™, Netflix™ Hulu™, Amazon Prime™, HBO Go™, etc.

As shown in FIG. 1, communications network 104 comprises an application function 108. Application function 108 may comprise a node that resides within communications network 104. Application function 108 may be implemented by one or more servers or other processing devices. Application function 108 includes QoE improvement logic 110. QoE improvement logic 110 is configured to improve a QoE associated with video content that is provided to user equipment 102 by content provider 106. QoE corresponds to the overall acceptability of an application or service (e.g., a video content providing service provided via content provider 106), particularly as seen by users of communications network 104 (i.e., user(s) of user equipment 102). QoE improvement logic 110 is configured to improve performance by allocating an appropriate bandwidth for transmitting video content to user equipment 102. It is noted that in certain embodiments, application function 108 may reside outside of communications network 104 (e.g., application function 108 may be provided as a cloud-based service).

For example, application function 108 may be configured to identify whether a request from user equipment 102 is for video content. In accordance with an embodiment, in response to determining that the request is for video content, QoE improvement logic 110 determines whether content provider 106 transmits one or more trigger messages (e.g., representational state transfer (REST)-application programming interface (API) based messages) responsive to the request. Content provider 106 may transmit a first trigger message at the start of the requested video content (to indicate the start of the video content) and transmit a second trigger message at the end of the requested video content (to indicate the end of the video content). If the first trigger message is transmitted, QoE improvement logic 110 may determine whether the first trigger message includes information regarding the video content to be provided to user equipment 102. The information may include the duration (e.g., 1 hour, 2 hours, etc.) of the video content and/or the total file size (e.g., 512 MB, 1 GB, etc.) of the video content. QoE improvement logic 110 may determine an appropriate bandwidth required to transmit the video content to user equipment 102 based on such information and allocate the determined bandwidth for user equipment 102. For example, QoE improvement logic 110 may generate a control rule based on the determined bandwidth. Communications network 104 provides the video content to user equipment 102 in accordance with the control rule. The control rule may specify the bandwidth at which the video content is to be transmitted to a particular user equipment (e.g., user equipment 102). This enables the video content to be provided to user equipment 202 at the appropriate bandwidth. bandwidth allocated for user equipment 202 may be irrespective of the level of subscription or plan (e.g., a bronze, silver, or gold plan) offered by content provider 206 to which the user of user equipment 202 subscribes. That is, the video content is provided at the allocated bandwidth regardless of the bandwidth specified by the subscription or plan level to which the user subscribes (i.e., the allocated bandwidth overrides the bandwidth specified by the subscription or plan level). The video content may be provided at the allocated bandwidth via the default bearer assigned to user equipment 202. Alternatively, the video content may be provided at the allocated bandwidth via a designated bearer requested from the operator (e.g., Mobile Network Operator (MNO)) of communications network 204 by user equipment 202.

The bandwidth is deallocated upon receiving the second trigger message. For example, upon receiving the second trigger message (i.e., the video session ends), QoE improvement logic 110 deletes the control rule so that the bandwidth allocated for user equipment 102 is deallocated. This limits the time the bandwidth is allocated for the particular user equipment based on the transmittal of the first trigger message and the second trigger message, thereby preventing wasteful allocation of bandwidth that could be used for other user equipment (not shown).

In the event that a first trigger message is received but it does not contain information regarding the video content, QoE improvement logic 110 may generate a control rule based on a predetermined (e.g., default) bandwidth. The control rule may specify the default bandwidth at which the video content is to be transmitted to a particular user equipment (e.g., user equipment 102). Upon receiving the second trigger message, QoE improvement logic 110 deletes the control rule such that the default bandwidth allocated for the particular user equipment is deallocated. This limits the time the default bandwidth is allocated for the particular user equipment based on the transmittal of the first trigger message and the second trigger message, thereby preventing wasteful allocation of bandwidth that could be used for other user equipment (not shown). However, the bandwidth that is allocated in this situation may not be optimal due to duration and/or size of the video content not being included in the first trigger message.

In an embodiment in which content provider 106 is not configured to transmit a trigger message, QoE improvement logic 110 programs a control rule that specifies that a default bandwidth is allocated for user equipment 102 at all times (i.e., the default bandwidth is not allocated based on receiving the first trigger message and the second trigger message).

Figure 2:
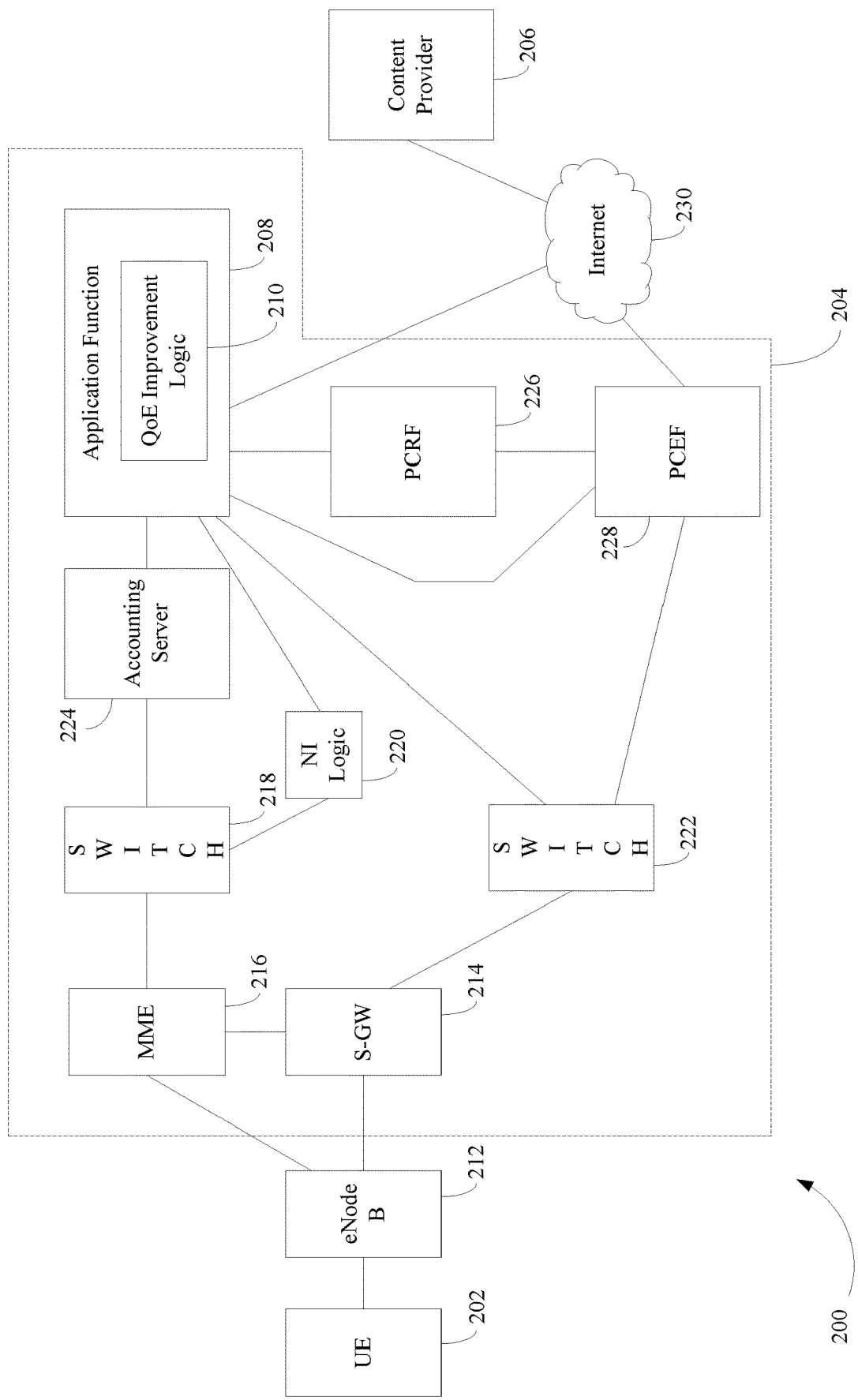
FIG. 2 is a block diagram of a system that is configured to provide an improved QoE for media content consumption to one or more users of a communications network in accordance with an example embodiment.

FIG. 2 is a block diagram of a system 200 that is configured to provide an improved QoE for media content consumption to one or more users of a communications network 204 in accordance with another embodiment. As shown in FIG. 2, system 200 includes user equipment 202, communications network 204, a content provider 206, and a cellular base station (eNodeB) 212. User equipment 202, communications networks 204 and content provider 206 are examples of user equipment 102, communications networks 104 and content provider 106, as respectively shown in FIG. 1. As further shown in FIG. 2, communications network 204 includes a mobility management entity (MME) 216, a serving gateway (S-GW) 214, a first switch 218, a second switch 222, an accounting server 224, network intelligence (NI) logic 220, an application function 208, a policy control rules function (PCRF) 226 and a policy control enforcement function (PCEF) 228. Content provider 206 is communicatively coupled to communications network 204 via the Internet 230. Each of MME 216, S-GW 214, first switch 218, NI logic 220, second switch 222, accounting server 224, application function 208, PCRF 226 and PCEF 228 is a node that resides within communications network 204. Each of MME 216, S-GW 214, first switch 218, NI logic 220, second switch 222, accounting server 224, application function 208, PCRF 226 and PCEF 228 may be implemented by one or more servers or other processing devices. It is noted that other components may be coupled between content provider 206 and communications network 204, such as, but not limited to, a content delivery network, one or more firewalls, etc. Such components are not shown for the sake of brevity.

eNodeB 212 is configured to provide packets received from one or more pieces of user equipment (e.g., user equipment 202) located within one or more predefined zones (e.g., geographical regions) to communications network 206. eNodeB 212 is also configured to provide packets received from communications network 206 to piece(s) of user equipment (e.g., user equipment 202) located within the zone(s). The packets may be internet protocol (IP)-based packets (e.g., hypertext transfer protocol (http) packets). During an initial registration process (also referred to as "network attachment") in which user equipment 202 attempts to join communications network 204, MME 216 is configured to perform the initial paging and authentication of user equipment 202. MME 216 is also configured to retain location information for user equipment 202 and selects an appropriate gateway (e.g., S-GW 214) during the initial registration process. MME 216 also provides certain information to first switch 218 during the initial registration process. For example, MME provides a first identifier (e.g., an MSISDN), which uniquely identifies each piece of user equipment (e.g., user equipment 202) connected to communications network 206, to first switch 218. S-GW 214 is configured to "handover" user equipment 202 when user equipment 202 moves from one zone covered by a first eNodeB (e.g., eNodeB 212) to another zone covered by a second eNodeB. S-GW 214 is also responsible for the data transfer of all packets that are transmitted to and from user equipment 202. S-GW 214 provides packets received from user equipment 202 to second switch 222 and receives packets from content provider 206 via second switch 222.

First switch 218 is configured to receive one or more messages provided by user equipment 202 and provide those message(s) to both NI logic 220 and accounting server 224. For example, first switch 218 duplicates the message(s) provided by user equipment 202 and provides the duplicated message(s) to each of NI logic 220 and accounting server 224. The message(s) may include the first identifier for user equipment 202.

NI logic 220 may be further configured to receive a second identifier associated with user equipment 102. The second identifier may be assigned to user equipment 202 by communications network 204 during the initial registration process. The second identifier may be an IP-based identifier (e.g., an IP address). For each piece of user equipment connected to communications network 204, NI logic 220 forms a mapping between that piece of user equipment's first identifier and second identifier. As will be described below, application function 208 may query NI logic 220 to look up a first identifier of user equipment 202 using the second identifier assigned to user equipment 202.

Accounting server 224 may be configured to perform accounting functions related to the use of certain services by user equipment 202. For example, accounting server 224 may determine an amount to charge a user for using a particular service. One such service is a service that provides improved QoE for media content consumption in accordance with embodiments described herein. Accounting server 224 may maintain a list of first identifiers (provided by MME 216 via first switch 218) for a plurality of user equipment (e.g., user equipment 202) that has subscribed to such a service and provides the list to application function 208. Accounting server 224 may be a DIAMETER protocol-based authentication, authorization and accounting (AAA) server, a RADIUS protocol-based AAA server, and/or the like. In accordance with an embodiment, in lieu of and/or in addition to using accounting server 224, communications network 204 may include a Home Subscriber System (HSS) and/or a Subscriber Profile Register (SPR). The HSS may maintain the above-described list of first identifiers. The SPR may comprise a database that maintains a listing of the Quality of Service (QoS) required for a particular user.

Second switch 222 is configured to provide packets received from user equipment 202 (via eNodeB 212 and S-GW 214) to at least application function 208. As will be described below, in embodiments in which header enrichment of packets is not performed, second switch 222 also provides packets received from user equipment 202 to PCEF 228. In an embodiment in which header enrichment of packets is performed, second switch 222 provides packets to only application function 208, and application function 208 forwards the packets to PCEF 228. As will be described in Subsection B below, in an embodiment in which header enrichment of packets is not performed and the bandwidth determination is determined by user equipment (e.g., user equipment 202), second switch 222 is configured to selectively send message(s) and/or packet(s) provided by user equipment 202 to application function 208 or PCEF 228. For example, if a message or packet is addressed to application function 208, second switch 222 provides the message or packet to application function 208. If a message or packet is addressed to PCEF 228, second switch 222 provides the message or packet to PCEF 228.

PCRF 226 is configured to specify one or more policy control rules that govern various aspects, such as, but not limited to, how much content provider 206 charges a subscriber (e.g., a user of user equipment 202) based on their volume of usage, the level of QoS provided to the subscriber, etc. Each policy control rule is associated with a particular piece of user equipment (e.g., user equipment 202) using that piece of user equipment's first identifier. In accordance with an embodiment in which communications network 204 includes an HSS and an SPR, PCRF 226 may communicate with the HSS and the SPR to determine whether a particular user has subscribed to a particular service (e.g., a service that provides improved QoE for media content consumption) and the QoS associated with that user by using the first identifier and specify policy control rule(s) for that user accordingly.

PCEF 228 is configured to ensure that the packets transmitted to user equipment 202 from content provider 206 are transmitted in accordance with the policy control rule(s) specified by PCRF 226. All packets originating from user equipment 202 are provided to content provider 228 via PCEF 228.

Application function 208 is an example of application function 108, as described above with reference to FIG. 1. Application function 208 includes QoE improvement logic 210. QoE improvement logic 210 is an example of QoE improvement logic 110, as described above with reference to FIG. 1. QoE improvement logic 210 is configured to improve a QoE that is associated with video content provided to user equipment 202 by content provider 206. QoE improvement logic 210 is configured to improve performance by allocating an appropriate bandwidth for transmitting video content to user equipment 202.

For example, QoE improvement logic 210 may be configured to identify whether a request (e.g., an http or https request) from user equipment 202 (received via second switch 222) is for video content. The request may include one or more identifiers that uniquely identifies user equipment 202. The identifier(s) may include the second identifier (i.e., an IP-based identifier), as described above. In accordance with an embodiment, in response to determining that the request is for video content, QoE improvement logic 210 determines whether content provider 206 transmits one or more trigger messages responsive to the request. The trigger message(s) may be provided to application function 208 directly via Internet 230. That is, the trigger message(s) may bypass PCEF 228. Content provider 206 may transmit a first trigger message at the start of the requested video content (to indicate the start of the video content) and transmit a second trigger message at the end of the requested video content (to indicate the end of the video content). If the first trigger message is transmitted, QoE improvement logic 210 determines whether the first trigger message includes information regarding the video content to be provided to user equipment 202. The information may include a duration (e.g., 1 hour, 2 hours, etc.) of the video content and a total file size (e.g., 512 MB, 1 GB, etc.) of the video content. QoE improvement logic 210 may determine a preferred bandwidth for transmitting video content to user equipment 202 based on such information and allocate the determined bandwidth for user equipment 202.

For example, the preferred bandwidth may be calculated in accordance to Equation 1, which is shown below:

$$BW = ROUNDUP(VFS(bytes)*8/T) \quad \text{(Equation 1)}$$

where VFS corresponds to the video file size (in bytes) of the video content, T corresponds to the duration of the video content and BW corresponds to the determined bandwidth. In accordance with Equation 1, the number resulting from VFS(bytes)*8/T is rounded up to the nearest integer value (e.g., 1, 2, 3, or 4 Mbps). Determining the bandwidth in such a manner advantageously enables the entirety of the video content to be provided to user equipment 202 in a time corresponding to the duration time of the video content. For example, if the duration time of the video content is 1 hour, the entirety of the video content is provided to user equipment 202 in 1 hour. This ensures that the user of user equipment 202 experiences an optimal QoE. It is noted that Equation 1 is shown for purely exemplary reasons and that the preferred bandwidth may be determined in other ways.

Upon determining the bandwidth, QoE improvement logic 210 may generate a policy control rule based on the determined bandwidth and update PCRF 226 with the policy control rule. The policy control rule specifies the first identifier (e.g., the MSISDN) of user equipment 202 and the bandwidth at which the video content is to be transmitted to user equipment 202. Communications network 204 provides the video content to user equipment 202 in accordance with the policy control rule. For example, packets including the video content are provided to PCEF 228 by content provider 206, and PCEF 228 enforces the policy control rule such that the packets are provided at the preferred bandwidth. The bandwidth is deallocated upon receiving the second trigger message. For example, upon receiving the second trigger message (i.e., the video session ends), QoE improvement logic 210 deletes the policy control rule from PCRF 226, thereby causing the bandwidth allocated for user equipment 202 to be deallocated. This limits the time the preferred bandwidth is allocated for user equipment 202 based on the transmittal of the first trigger message and the second trigger message, thereby preventing wasteful allocation of bandwidth that could be used for other user equipment (not shown).

In the event that a first trigger message is received but it does not contain information regarding the video content, QoE improvement logic 210 may generate a policy control rule based on a predetermined (e.g., default) bandwidth and update PCRF 226 with the policy control rule. The policy control rule may specify the default bandwidth (e.g., 1, 2, 3, or 4 Mbps) at which the video content is to be transmitted to user equipment 202.

In accordance with an embodiment, in the event that the first trigger message does not contain information regarding the video content, QoE improvement logic 210 analyzes the request from user equipment 202 to determine whether it contains information regarding the video content. For example, the request may include the file name being requested from content provider 206. The size and/or duration of the video content may be part of the video file name (e.g., "MOVIE_NAME_512 MB_2_34"). In this example, "MOVIE_NAME" corresponds to the name of the video content, "512 MB" corresponds to the size of the video file, and "2_34" corresponds to the duration (i.e., 2 hours and 34 minutes). QoE improvement logic 210 may determine the preferred bandwidth for transmitting the video content to user equipment 202 based on such information in accordance with Equation 1 and allocate the determined bandwidth for user equipment 202 by generating a policy control rule as described above.

In the event that the request from user equipment 202 does not include such information, QoE improvement logic 210 may generate a policy control rule based on a predetermined (e.g., default) bandwidth as described above.

Upon receiving the second trigger message (i.e., the video session ends), QoE improvement logic 210 deletes the policy control rule from PCRF 226, thereby causing the default bandwidth allocated for the particular user equipment to be deallocated. This limits the time the default bandwidth is allocated for user equipment 202 based on the transmittal of the first trigger message and the second trigger message, thereby preventing wasteful allocation of bandwidth that could be used for other user equipment (not shown). However, the bandwidth that is allocated in this situation may not be optimal due to duration and/or size of the video content not being known.

In an embodiment in which content provider 206 does not transmit trigger message(s), QoE improvement logic 210 generates a policy control rule that specifies that a default bandwidth is allocated for user equipment 202 at all times.

In accordance with an embodiment, the policy control rule determined by application function 208 is provided directly to PCEF 226 rather than being provided to PCRF 226. For example, communications network 204 may not include PCRF 226. In this case, PCEF 228 is configured to be programmed with the policy control rule and enforces the policy control rule accordingly.

As described above, when determining the bandwidth (i.e., a default bandwidth or a preferred bandwidth) at which video content is to be provided to user equipment 202, a policy control rule associated with user equipment 202 is generated. The policy control rule is associated with user equipment 202 using the first identifier of user equipment. In accordance with an embodiment, the first identifier may be determined by application function 208 using NI logic 220. For example, QoE improvement logic 210 may query NI logic 220 using the second identifier (e.g., the IP-based identifier) included in the request. In response, NI logic 220 retrieves the first identifier mapped to the second identifier and provides it to QoE improvement logic 210. QoE improvement logic 210 generates the policy control rule based on the determined bandwidth and associates the policy control rule with the obtained first identifier.

In accordance with another embodiment, in lieu of querying NI logic 220 for the first identifier (e.g., the MSISDN associated with user equipment 202), QoE improvement logic 210 may query Network Address Translation (NAT) equipment (e.g., a router, a gateway, and/or the like) that is coupled to communications network 204 or another device coupled to the NAT equipment, such as Network Intelligence equipment. The NAT equipment or Network Intelligence equipment may maintain a mapping between (1) an external IP address and/or port number combination associated with user equipment 202; and (2) an internal IP address and/or port number combination and MSISDN of user equipment 202. The external IP address is an identifier associated with user equipment that is known to entities outside of communications network 204. The internal IP address is an identifier that is known internally to communications network 204. The above-described second identifier is an example of an internal IP address. For example, in the event QoE improvement logic 210 requires the first identifier associated with user equipment 202, QoE improvement logic 210 may send a query that includes the external IP address and/or port number associated with user equipment 202 to the NAT equipment. In response, the NAT equipment or Network Intelligence equipment returns the first identifier (e.g., the MSISDN) and/or second identifier (e.g., the internal IP address) associated with user equipment 202 to QoE improvement logic 210.

In accordance with a further embodiment, user equipment 202 is configured to modify a portion (e.g., the header) of the request (e.g., an http request) to include the first identifier. This process may be referred to as header enrichment. In accordance with an embodiment, user equipment 202 encrypts the request (e.g., to generate an https request) after performing header enrichment. Application function 208, upon receiving the header enriched request (e.g., an http or https request), may provide the header enriched request to PCEF 228, which in turn provides the header enriched request to content provider 206. Content provider 206 may determine the first identifier of user equipment 202 by analyzing the request and include the determined first identifier in the first trigger message sent to application function 208. In this way, application function 208 simply needs to analyze the trigger message to obtain the first identifier rather than querying NI logic 220 (or the NAT equipment) for purposes of generating a policy control rule of user equipment 202. This advantageously reduces the processing power utilized by application function 208. In accordance with an embodiment, application function 208 may generate a policy control rule based on a default bandwidth upon determining the first identifier from the header enriched request. Because the first identifier is known before the first trigger message is provided by content provider 206, application function 208 may preemptively allocate the default bandwidth before transmission of the video content. Allocating the default bandwidth before transmission of the video content ensures that each packet containing the video content is transmitted at the default bandwidth. In the event that content provider 206 provides a trigger message that includes the duration of the video content and the size of the video content, application function 208 may determine the preferred bandwidth, generate a policy control rule based on the preferred bandwidth, and update PCRF 226 with the policy control such that remaining portions of the video content are provided at the preferred bandwidth.

In accordance with yet another embodiment, header enrichment may be performed by application function 208 in lieu of user equipment 202. In accordance with such an embodiment, when application function 208 receives a request (e.g., an http request) for video content from user equipment, application function 208 may analyze the request to determine the second identifier included in the request and query NI logic 220 using the second identifier. In response, NI logic 220 retrieves the first identifier mapped to the second identifier and provides it to application function 208. Application function 208 may then enrich the header of the request to include the first identifier and provide the header enriched request to PCEF 228, which in turn provides the header enriched request to content provider 206. Content provider 206 may determine the first identifier of user equipment 202 by analyzing the request and include the determined first identifier in the first trigger message sent to application function 208.

In accordance with an embodiment, user equipment 202 may encrypt the requests (e.g., to generate https requests) before transmitting them to communications network 204. In accordance with an embodiment in which application function 208 performs header enrichment, when application function 208 receives the encrypted request, QoE improvement logic 210 may be configured to decrypt the request. For example, QoE improvement logic 210 may obtain a certificate that is used to decrypt the request. The certificate may be obtained from content provider 206 or from a third party certificate service that provides the certificate to QoE improvement logic 210. Once the request is decrypted using the obtained certificate, QoE improvement logic 210 may enrich the header with the first identifier as described above and re-encrypt the request. The re-encrypted request is then provided to PCEF 228, which forwards the encrypted request to content provider 206.

In accordance with an embodiment, to reduce loading of application function 208, application function 208 may limit the number of packets (e.g., requests) that are analyzed after PCRF 226 has been programmed with a control rule. For example, once PCRF 226 has been programmed, application function 208 may set a timer to a predetermined time period (e.g., 180 seconds). Packets received from user equipment 202 during the predetermined time period may be ignored, and only packets received after expiration of the predetermined period may be analyzed. This prevents PCRF 226 from being repeatedly programmed and also limits the decrypting/encrypting and header enrichment performed by application function 208. The predetermined time period may be configurable based on a level of performance required by communications network 204.

Figure 3:
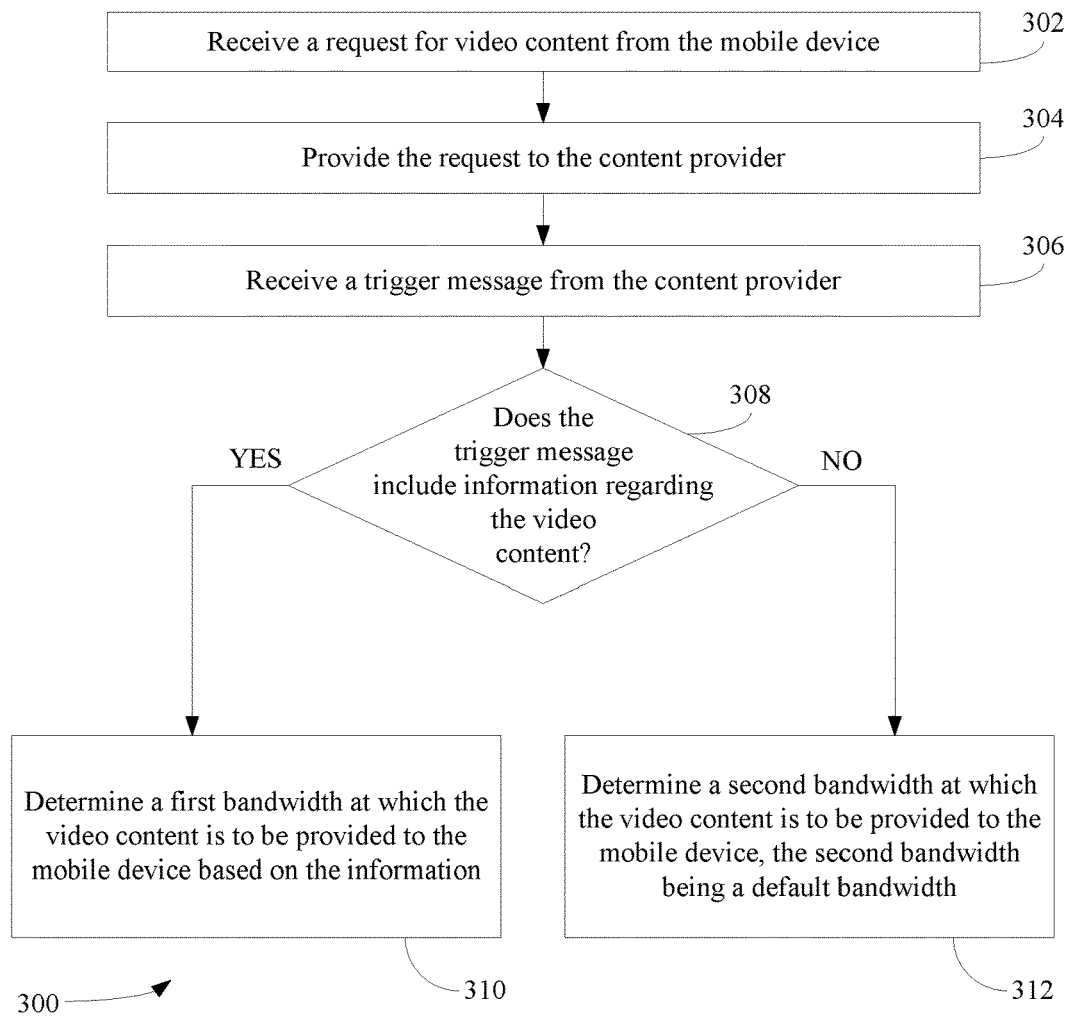
FIG. 3 depicts a flowchart of a method for providing an improved QoE for media content consumption when providing video content to user equipment via a communications network in accordance with an example embodiment.
Figure 4:
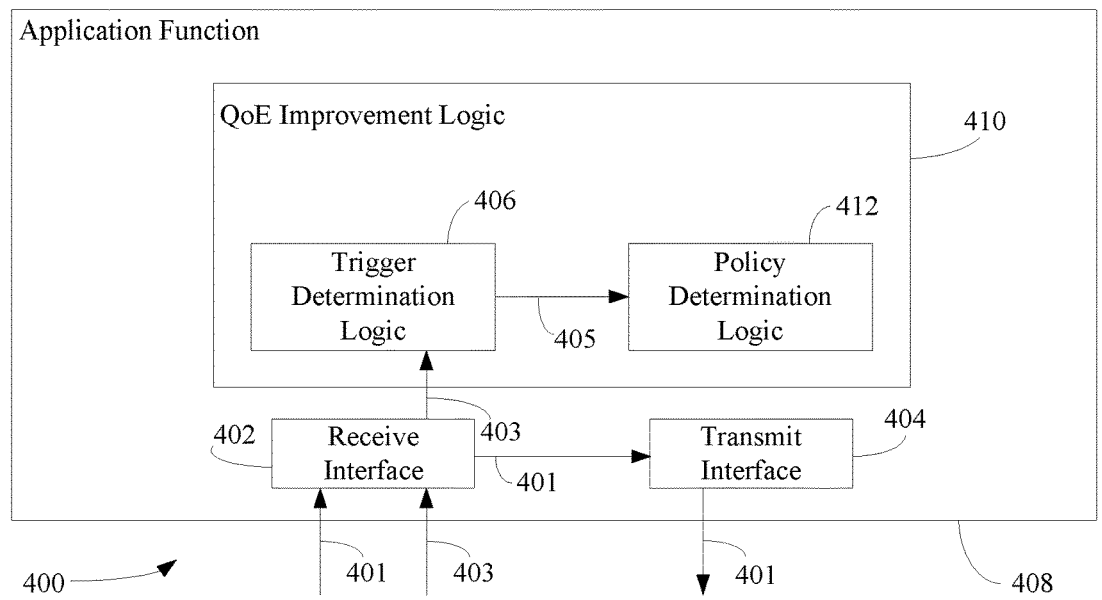
FIG. 4 shows a block diagram of an application function in accordance with an example embodiment.

Accordingly, in embodiments, video content may be provided to user equipment with improved QoE in various ways. For example, FIG. 3 depicts a flowchart 300 of a method for providing a preferred QoE for media content consumption when providing video content to user equipment via a communications network in accordance with an example embodiment. System 100 and 200 as respectively shown in FIGS. 1 and 2 may operate according to flowchart 300. For illustrative purposes, flowchart 300 is described with reference to FIG. 4. FIG. 4 shows a block diagram 400 of an application function 408 in accordance with an example embodiment. Application function 408 is an example of application function 108 and application function 208 as respectively shown in FIGS. 1 and 2. Application function 408 includes a receive interface 402, a transmit interface 404 and QoE improvement logic 410. QoE improvement logic 410 includes trigger determination logic 406 and policy determination logic 412. QoE improvement logic 410 is an example of QoE improvement logic 110, as shown in FIG. 1. It is noted that while receive interface 402 and transmit interface 404 are shown as two different entities, receive interface 402 and transmit interface 404 may comprise a single entity. For example, receive interface 402 and transmit interface 404 may be implemented as a transceiver. Further structural and operational embodiments will be apparent to persons skilled in the relevant art(s) based on the discussion regarding flowchart 300. Flowchart 300 and application function 408 are described as follows.

Flowchart 300 begins with step 302. At step 302, a request for video content from a mobile device is received. For example, as shown in FIG. 4, a receive interface 402 of application function 408 receives a request 401 for video content from a mobile device (e.g., user equipment 202, as shown in FIG. 2).

At step 304, the request is provided to a content provider. For example, as shown in FIG. 4, receive interface 402 provides request 401 to transmit interface 404, and transmit interface 440 provides request 401 to a content provider (e.g., content provider 206, as shown in FIG. 2).

At step 306, a trigger message is received from the content provider. For example, as shown in FIG. 4, receive interface 402 receives a trigger message 403 from the content provider (e.g., content provider 206, as shown in FIG. 2). Receive interface 402 provides trigger message 403 to QoE improvement logic 410. In accordance with an embodiment, trigger message 403 indicates the start of the video content.

At step 308, a determination is made as to whether the trigger message includes information regarding the video content. For example, as shown in FIG. 4, trigger determination logic 406 determines whether trigger message 403 includes information regarding the video content. If it is determined that the trigger message includes information regarding the video content, flow continues to step 310. Otherwise, flow continues to step 312.

In accordance with one or more embodiments, the information includes the duration of the video content and the size of the video content.

At step 310, a first bandwidth at which the video content is to be provided to the mobile device is determined based on the information. For example, as shown in FIG. 4, trigger determination logic 406 provides information regarding the video content (i.e., information 405) to policy determination logic 412, and policy determination logic 412 determines the first bandwidth at which the video content is to be provided to the mobile device based on the information.

At step 312, a second bandwidth at which the video content is to be provided to the mobile device is determined. The second bandwidth is a default bandwidth. For example, as shown in FIG. 4, policy determination logic 412 determines the second bandwidth at which the video content is to be provided to the mobile device.

Figure 5:
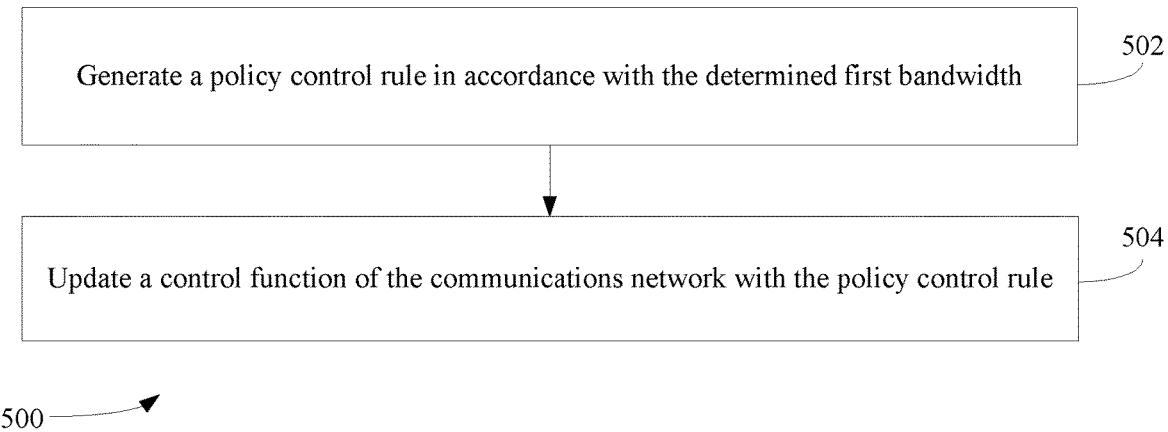
FIG. 5 depicts a flowchart of a method for updating a control function of a communications network in accordance with an example embodiment.
Figure 6:
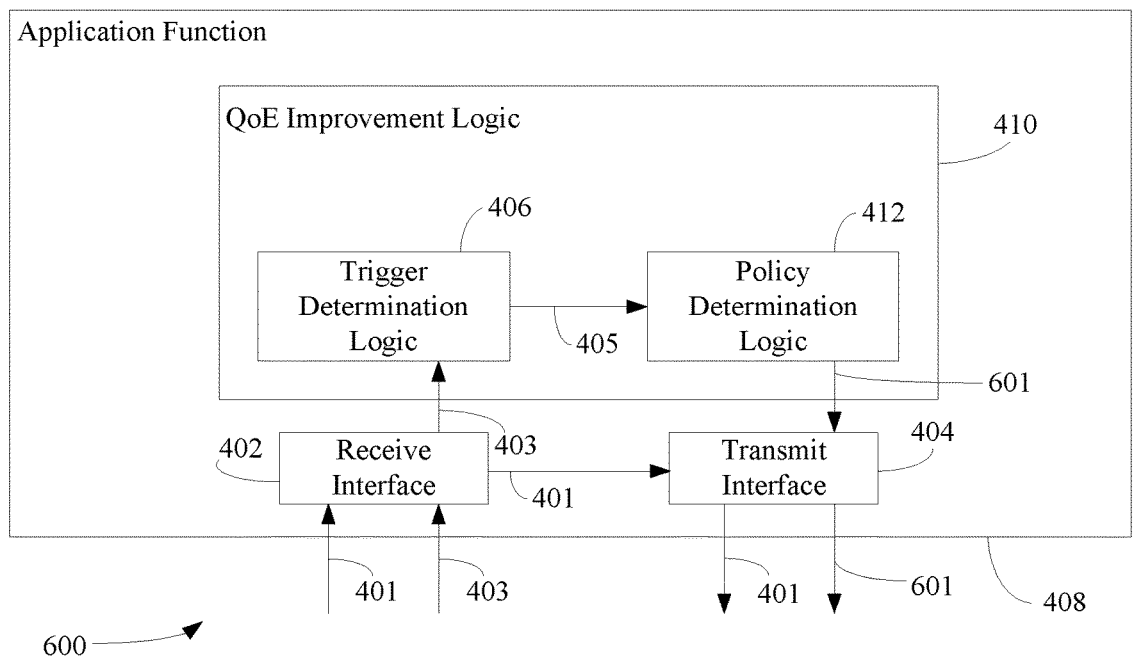
FIG. 6 shows a block diagram of an application function in accordance with an example embodiment.

In accordance with one or more embodiments, after the first bandwidth is determined, a control function of the communications network may be updated so that the video content is provided at the determined first bandwidth. Accordingly, FIG. 5 shows a flowchart 500 of a method for updating a control function of a communications network in accordance with an example embodiment. System 100 and 200 as respectively shown in FIGS. 1 and 2 may operate according to flowchart 500. For illustrative purposes, flowchart 500 is described with reference to FIG. 6. FIG. 6 shows a block diagram 600 of application function 408 as described above with reference to FIG. 4. Further structural and operational embodiments will be apparent to persons skilled in the relevant art(s) based on the discussion regarding flowchart 500. Flowchart 500 and application function 408 of FIG. 6 are described as follows.

Flowchart 500 begins with step 502. At step 502, a policy control rule is generated in accordance with the determined first bandwidth. For example, as shown in FIG. 6, policy determination logic 412 generates a policy control rule in accordance with the determined first bandwidth.

At step 504, a control function of the communications network is updated with the policy control rule. For example, as shown in FIG. 6, policy determination logic 412 updates a control function of the communications network (e.g., communications network 204, as shown in FIG. 2) by providing the policy control rule (i.e., policy control rule 601) to transmit interface 404, and transmit interface 404 provides policy control rule 601 to a control function of the communications network.

In accordance with one or more embodiments, the control function is a PCRF (i.e., PCRF 226, as shown in FIG. 2).

Figure 7:
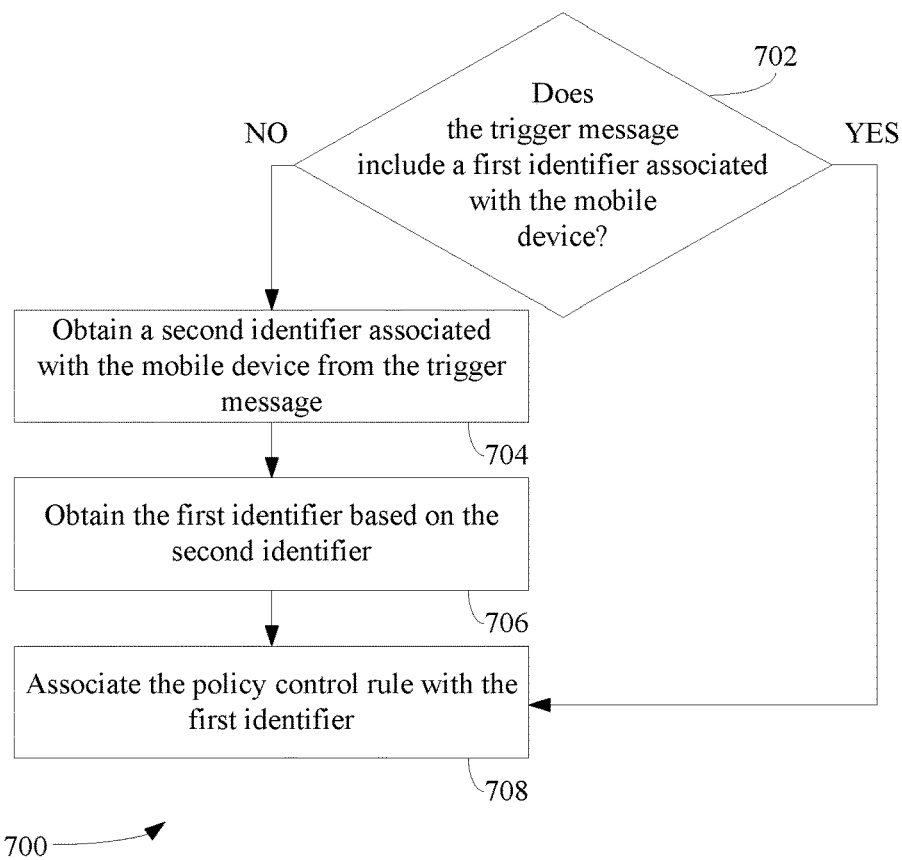
FIG. 7 depicts a flowchart of a method for generating a policy control rule in accordance with an example embodiment.
Figure 8:
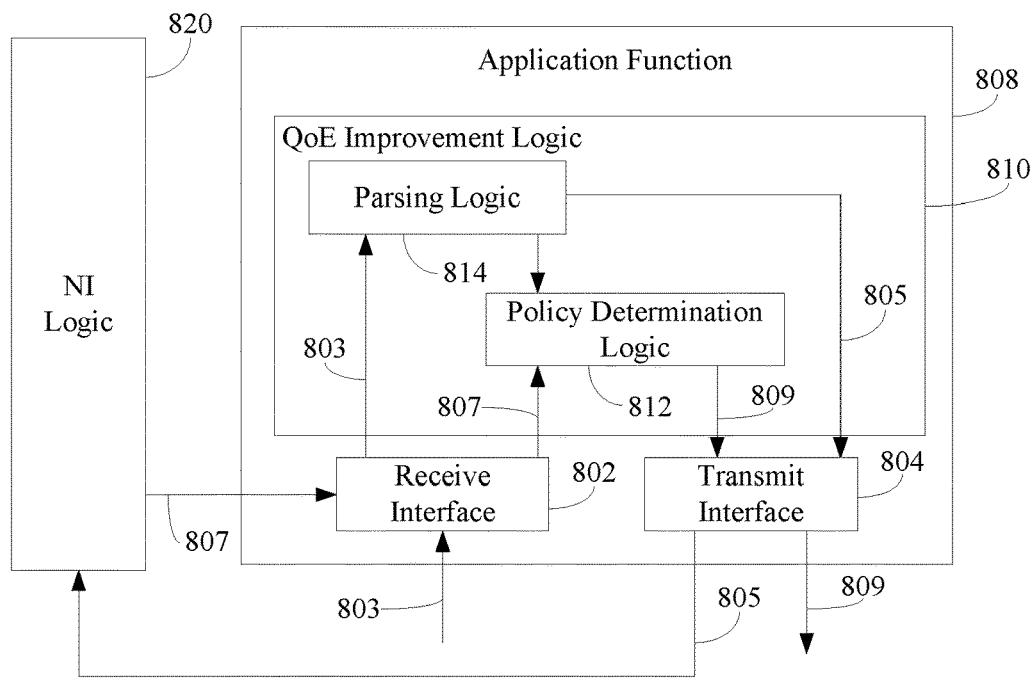
FIG. 8 shows a block diagram of an application function coupled to network intelligence logic in accordance with an example embodiment.

In accordance with one or more embodiments, the generation of the policy control rule of step 502 of FIG. 5 may comprise associating an identifier of the mobile device with the policy control rule. Accordingly, FIG. 7 depicts a flowchart 700 of a method for generating a policy control rule in accordance with an example embodiment. System 100 and 200 as respectively shown in FIGS. 1 and 2 may operate according to flowchart 700. For illustrative purposes, flowchart 700 is described with reference to FIG. 8. FIG. 8 shows a block diagram 800 of an application function 808 coupled to NI logic 820 in accordance with an example embodiment. NI logic 820 is an example of NI logic 220, as shown in FIG. 2. Application function 808 is an example of application function 408, as shown in FIGS. 4 and 6. Application function 808 includes a receive interface 802, a transmit interface 804 and QoE improvement logic 810. QoE improvement logic 810 includes parsing logic 814 and policy determination logic 812. Receive interface 802, transmit interface 804, QoE improvement logic 810 and policy determination logic 812 are examples of receive interface 402, transmit interface 404, QoE improvement logic 410 and policy determination logic 812, as respectively shown in FIGS. 4 and 6. Further structural and operational embodiments will be apparent to persons skilled in the relevant art(s) based on the discussion regarding flowchart 700. Flowchart 700 and application function 808 are described as follows.

Flowchart 700 begins with step 702. At step 702, a determination is made as to whether the trigger message comprises a first identifier associated with the mobile device. If a determination is made that the trigger message does not include the first identifier flows continues to steps 704, 706 and 708. If the determination is made that the trigger message includes the first identifier, flow continues to step 708. For example, as shown in FIG. 8, receive interface 802 receives a trigger message 803, and provides trigger message 803 to parsing logic 814. Parsing logic 814 analyzes (e.g., parses) trigger message 803 to determine if a first identifier associated with the mobile device (e.g., user equipment 202, as shown in FIG. 2) is included in trigger message 803.

At step 704, a second identifier associated with the mobile device is obtained from the trigger message. For example, as shown in FIG. 8, parsing logic 814 analyzes trigger message 803 to find and obtain the second identifier associated with the mobile device.

In accordance with one or more embodiments, the first identifier is an MSISDN associated with the mobile device, and the second identifier is an IP-based identifier (e.g., an IP address) associated with the mobile device.

At step 706, the first identifier is obtained based on the second identifier. For example, as shown in FIG. 8, parsing logic 814 generates a query 805 that includes the second identifier and provides query 805 to transmit interface 804. Transmit interface 804 provides query 805 to NI logic 820. NI logic 820 looks up the first identifier mapped to the second identifier and provides the first identifier (i.e., identifier 807) to receive interface 802. Receive interface 802 provides identifier 807 to policy determination logic 812.

At step 708, the policy control rule is associated with the first identifier. For example, as shown in FIG. 8, policy determination logic 812 associates identifier 807 with the policy control rule and provides the policy control rule (i.e., policy control rule 809) to transmit interface 804. Transmit interface 804 provides policy control rule 809 to the control function of the communications network (e.g., PCRF 226 of communications network 204, as shown in FIG. 2).

Figure 9:
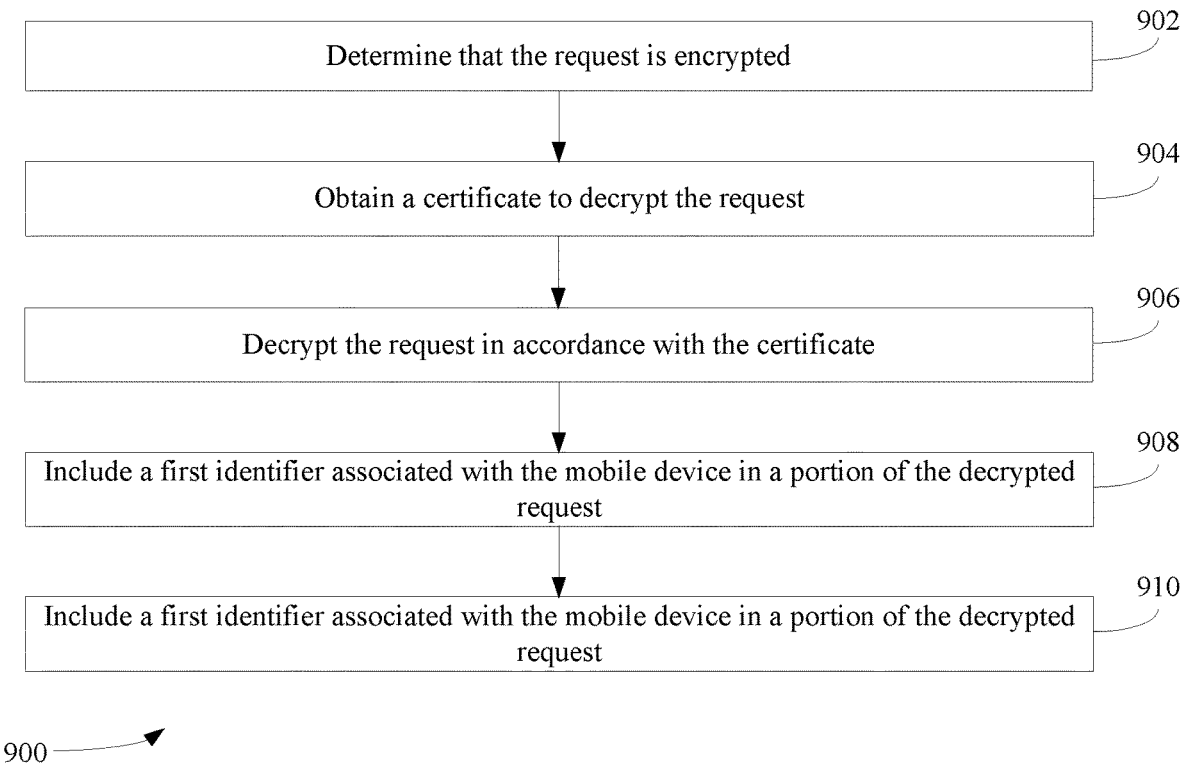
FIG. 9 depicts a flowchart of a method for enriching an encrypted request in accordance with an example embodiment.
Figure 10:
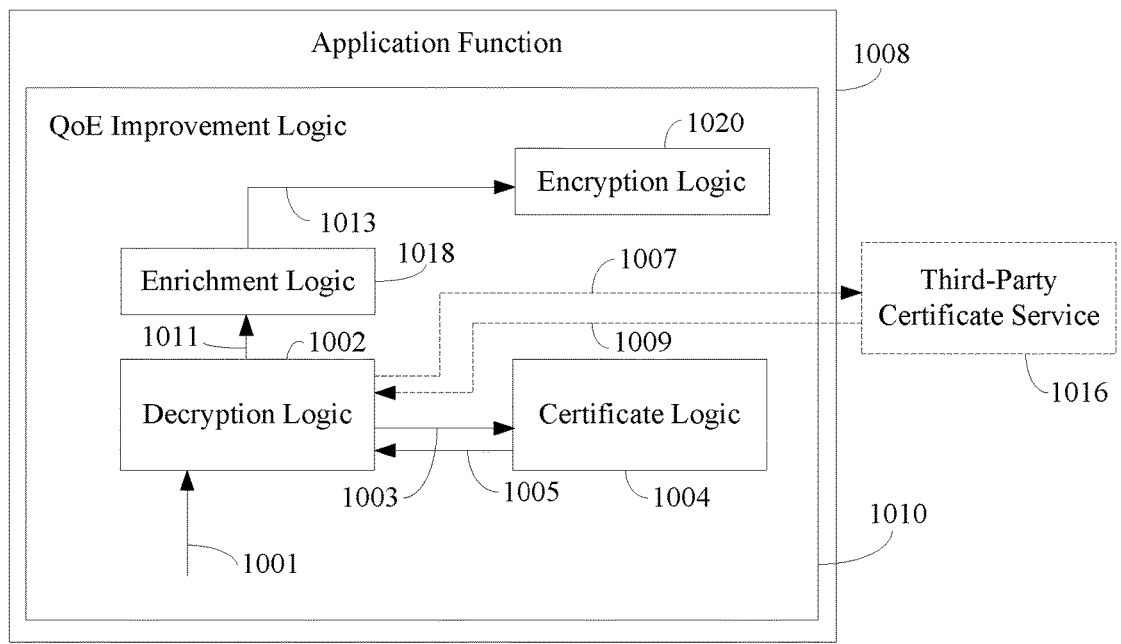
FIG. 10 shows a block diagram of an application function in accordance with an example embodiment.

In accordance with one or more embodiments, the application function may enrich an encrypted request to include the first identifier. Accordingly, FIG. 9 depicts a flowchart 900 of a method for enriching an encrypted request in accordance with an example embodiment. System 100 and 200 as respectively shown in FIGS. 1 and 2 may operate according to flowchart 900. For illustrative purposes, flowchart 900 is described with reference to FIG. 10. FIG. 10 shows a block diagram 1000 of an application function 1008 in accordance with an example embodiment. Application function 1008 is an example of application function 808, as shown in FIG. 8. Application function includes QoE improvement logic 1010. QoE improvement logic 1010 is an example of QoE improvement logic 810, as shown in FIG. 8. QoE improvement logic 1010 includes decryption logic 1002, certificate logic 1004, enrichment logic 1018 and encryption logic 1020. Further structural and operational embodiments will be apparent to persons skilled in the relevant art(s) based on the discussion regarding flowchart 900. Flowchart 900 and application function 1008 are described as follows.

Flowchart 900 begins with step 902. At step 902 a determination is made that the request is encrypted. For example, as shown in FIG. 10 decryption logic 1002 may determine that a request 1001 from user equipment (e.g., user equipment 202, as shown in FIG. 2) is encrypted. Request 1001 may be received from a receive interface (e.g., receive interface 802, as shown in FIG. 8), which is not shown for the sake of brevity.

At step 904, a certificate is obtained to decrypt the request. For example, as shown in FIG. 10, decryption logic 1002 may send a query 1003 to certificate logic 1004. In response certificate logic 1004 provides a certificate 1005 to decryption logic 1002. In accordance with an embodiment, in lieu of querying certificate logic 1004, decryption logic 1002 may send a query 1007 to a third-party certificate service 1016 communicatively coupled to QoE improvement logic 1010. Third-party certificate service 1016 may be an application executing within application function 1008. Alternatively, third-party certificate service 1016 may be an application executing on another node within the communications network (e.g., communications network 204, as shown in FIG. 2). In accordance with another embodiment, decryption logic 1002 may first query certificate logic 1004. If certificate logic 1004 is unable to provide a certificate, decryption logic 1002 queries third-party certificate service 1016 to obtain the certificate.

At step 906, the request is decrypted in accordance with the certificate. For example, as shown in FIG. 10, decryption logic 1002 decrypts request 1001 in accordance with certificate 1005 (or certificate 1009).

At step 908, the first identifier associated with the mobile device is included in a portion of the decrypted request. For example, as shown in FIG. 10, decryption logic 1002 provides a decrypted request 1011 to enrichment logic 1018, and enrichment logic 1018 includes a first identifier (e.g., an MSISDN) associated with the mobile device in portion of decrypted request 1011. The first identifier to be included in decrypted request 1011 may be obtained by querying NI logic (e.g., NI logic 820, as shown in FIG. 8) using another identifier included in decrypted request 1011 (e.g., a second identifier, such as an IP address). After the first identifier is included in decrypted request 1011, QoE improvement logic 1010 may re-encrypt decrypted request 1011 and provide the re-encrypted request to the content provider.

In accordance with one or more embodiments, the portion of the decrypted request in which the first identifier is included is a header portion of the decrypted request.

At step 910, the decrypted request is encrypted. For example, as shown in FIG. 10, enrichment logic 1018 provides a decrypted request 1013 that includes the first identifier to encryption logic 1020, and encryption logic 1020 encrypts the decrypted request.

B. Bandwidth Determination by User Equipment

In accordance with an embodiment, a piece of user equipment may include a software application that estimates certain network conditions while video content is being provided thereto. The software application may determine a preferred bandwidth (e.g., bitrate) at which the video content is to be provided based on the estimated network conditions. The software application may provide the determined bandwidth to the application function, and the application function may generate a policy control rule based on the determined bandwidth. Given that the application function may be communicatively coupled to millions of user equipment at any given point in time, offloading the bandwidth determination to the user equipment advantageously reduces the load on the application function.

Figure 11:
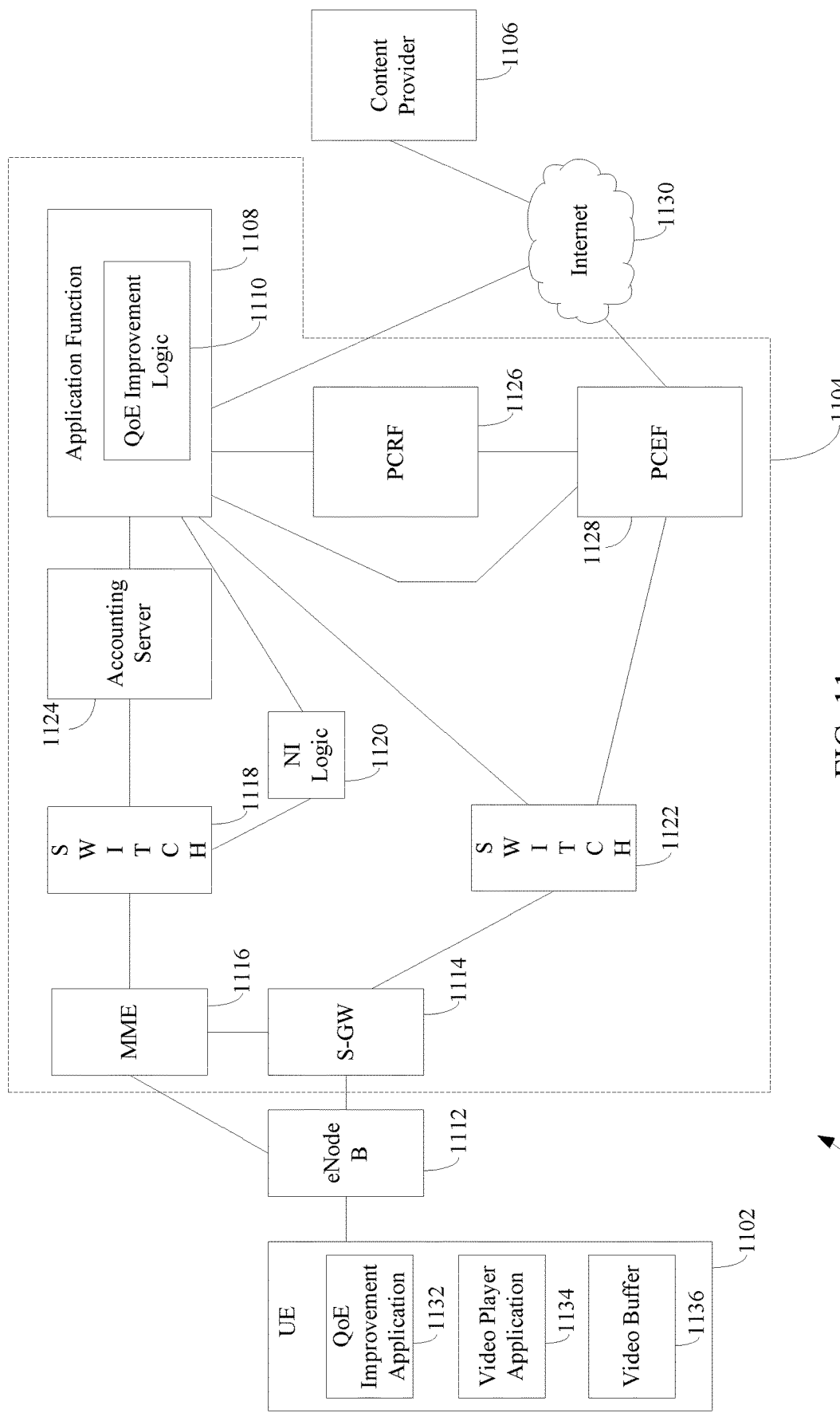
FIG. 11 is a block diagram of a system that is configured to provide an improved QoE for media content consumption to user equipment based on a software application executing on the user equipment in accordance with an example embodiment.

Accordingly, FIG. 11 is a block diagram of a system 1100 that is configured to provide an improved QoE for media content consumption to user equipment 1102 based on a software application (i.e., QoE improvement application 1132) executing on user equipment 1102 in accordance with an example embodiment. As shown in FIG. 11, system 1100 includes user equipment 1102, communications network 1104, a content provider 1106, and a cellular base station (eNodeB) 1112. User equipment 1102, communications networks 1104, content provider 1106 and eNodeB 1112 are examples of user equipment 202, communications networks 204, content provider 206 and eNodeB 212, as respectively shown in FIG. 2. As further shown in FIG. 11, communications network 1104 includes an MME 1116, an S-GW 1114, a first switch 1118, a second switch 1122, an accounting server 1124, NI logic 1120, an application function 1120, a PCRF 1126 and a PCEF 1128. MME 1116, S-GW 1114, first switch 1118, second switch 1122, accounting server 1124, NI logic 1120, application function 1108, PCRF 1126 and PCEF 1128 are examples of MME 216, S-GW 214, first switch 218, second switch 222, accounting server 224, NI logic 220, application function 208, PCRF 226 and PCEF 228, as shown in FIG. 2. Content provider 1106 is communicatively coupled to communications network 1104 via the Internet 1130. It is noted that other components may be coupled between content provider 1106 and communications network 1104, such as, but not limited to, a content delivery network, one or more firewalls, etc. Such components are not shown for the sake of brevity.

As shown in FIG. 11, user equipment 1102 includes QoE improvement application 1132, a video player application 1134 and a video buffer 1136. QoE improvement application 1132 is a software application that, when executed, estimates network conditions of communications network 1104 and determines a bandwidth at which video content is to be provided to user equipment 1102 based on the estimated network conditions. Video player application 1134 is a software application that, when executed, plays back video content on user equipment 1132. Video buffer 1136 may be a segment of memory included in user equipment 202. Examples of memory include, but are not limited to a hard disk, a removable magnetic disk, a removable optical disk, flash memory cards, secure digital (SD) memory cards, digital video disks, random access memories (RAMs), and the like.

When requesting video content from content provider 1106, user equipment 1102 may send a request for the video content to content provider 1106, and content provider 1106 may provide the video content to user equipment 1102 (as described above in Subsection A). In accordance with an embodiment, before user equipment 1102 sends a request for the video content, user equipment 1102 sends a request for a manifest file from content provider 1106. The manifest file contains various information, such as, but not limited to, one or more location identifier(s) (e.g., Uniform Resource Locators (URLs)) at which the video content can be obtained and the size of each video file that comprises the requested video content. Using the location identifier(s), user equipment 1102 sends a request for the video content, and content provider 1106 provides the video content accordingly.

Upon receiving the video content, video player application 1134 may be initiated and/or begins playback of the video content. Once playback begins, QoE improvement application 1132 queries video playback application 1134 for the video file size for each of the one or more video files that comprises the video content stream. Video playback application 1134 obtains this information from the manifest file. After video playback application 1134 provides QoE improvement application 1132 with the video file size(s), QoE improvement application 1132 sums each of the video file size(s) to determine the total video file size of the video content stream.

QoE improvement application 1132 may request allocation of a video buffer size from video buffer 1136 corresponding to the determined total video file size from an operating system (not shown) executing on user equipment 1102. The operating system may determine a maximum amount of space that can be allocated based on user equipment 202 resources and notifies QoE improvement application 1132 of the amount that has been allocated. If the size of video buffer 1136 allocated is less than a predetermined percentage of the determined total video file size (e.g., 25%), QoE improvement logic 1132 may determine that there is not enough space allocated in video buffer 1136 to warrant an increase in the bandwidth (i.e., the limited space in video buffer 1136 would not be able to store video content received at a higher bandwidth). However, using the amount of video buffer 1136 that has been allocated, QoE improvement logic 1132 estimates the network conditions and determines a minimum recommended bit rate at which remaining portions of the video content stream are provided to user equipment 1102. If the size of video buffer 1136 allocated is greater than or equal the predetermined percentage of the determined total video file size, QoE improvement logic 1132 may determine there is enough space allocated in video buffer 1136 to warrant an increase in the bandwidth (i.e., the space allocated in the video buffer would be able to handle video content received at a higher bandwidth). Using the portion of video buffer 1136 that has been allocated, QoE improvement application 1132 estimates the network conditions and determines whether the bandwidth should be increased or decreased.

The following description describes operations performed by QoE improvement application 1132 if the size of video buffer 1136 allocated by the operating system is greater than or equal to the predetermined percentage of the determined total video file size. For example, QoE improvement application 1132 may determine the total number of bytes for all outstanding video files that have yet to be fully downloaded in video buffer 1136. That is, this determination takes into account the entire size of an outstanding video file regardless of whether that file has been partially downloaded into video buffer 1136. For example, if the complete video file size for a given video file is 512 KB, and a portion of the video file (e.g., 128 KB) has been downloaded into video buffer 1136, QoE improvement application 1132 uses the complete video file size (i.e., 512 KB) when determining the total video duration for all such outstanding files. In accordance with an embodiment, the total number of bytes for all outstanding video files may be determined in accordance with Equation 2, which is shown below:

TOTAL VFS=Video File 1 size+Video File 2 size++ Video File N size  (Equation 2)

where Video File 1 size corresponds to the total size of a first outstanding video file, Video File 2 size corresponds to the total size of a second outstanding video file, Video File N size corresponds to the total size of an Nth outstanding video file (where N is any positive integer) and TOTAL VFS corresponds to the determined total number of bytes for all outstanding video files (i.e., Video File 1, Video File 2 and Video File N).

QoE improvement application 1132 may determine the total video duration time for all such outstanding files. That is, this determination takes into the account of the entire video duration of a video file regardless of whether that file has been partially downloaded into video buffer 1136. For example, if the complete duration for a given video file size is 10 minutes, and some part of the of the video file size has been downloaded, QoE improvement application 1132 uses the complete duration (i.e., 10 minutes) when determining the total video duration for all such outstanding files. In accordance with an embodiment, the total video duration time for all outstanding video files may be determined in accordance with Equation 3, which is shown below:

TOTAL VDT=Video File 1 duration+Video File 2 duration++Video File N duration  (Equation 3)

where Video File 1 duration corresponds to the total video duration time of a first outstanding video file, Video File 2 duration corresponds to the total video duration time of a second outstanding video file, Video File N size corresponds to the total video duration time of an Nth outstanding video file and TOTAL VDT corresponds to the determined total video duration time for all outstanding video files (i.e., Video File 1, Video File 2 and Video File N).

QoE improvement application 1132 may also determine the total number of bytes that have been downloaded into video buffer 1136 for all outstanding files. For example, if the complete video file for a given video file size is 512 KB, and 128 KB of the video file has been downloaded into video buffer 1136, QoE improvement application 1132 uses the downloaded number of bytes (i.e., 128 KB) when determining the total number of bytes that have been downloaded. In accordance with an embodiment, the total number of bytes that have been downloaded for all outstanding video files may be determined in accordance with Equation 4, which is shown below:

TOTAL VFS Downloaded=Downloaded Video File 1 size+Downloaded Video File 2 duration++ Downloaded Video File N duration  (Equation 4)

where Downloaded Video File 1 size corresponds to the total amount of a first outstanding video file that has been downloaded, Downloaded Video File 2 size corresponds to the total amount of a second outstanding video file that has been downloaded, Downloaded Video File N size corresponds to the total amount of an Nth outstanding video file that has been downloaded and TOTAL VFS Downloaded corresponds to the total number of bytes that have been downloaded for all outstanding video files (i.e., Video File 1, Video File 2 and Video File N).

Next, QoE improvement application 1132 may determine a download ratio based on the determined total number of bytes that have been downloaded and the total number of bytes for all outstanding video files. In accordance with an embodiment, the download ratio may be determined in accordance with Equation 5, which is shown below:

$$DR = \text{Total VFS Downloaded} / \text{TOTAL VFS} \quad \text{(Equation 5)}$$

where DR corresponds to the download ratio.

The download ratio may be used to determine an estimated remaining video duration time. In accordance with an embodiment, the estimated remaining video duration time may be determined in accordance with Equation 6, which is shown below:

$$\text{ER VDT} = DR * \text{TOTAL VDT} \quad \text{(Equation 6)}$$

where ER VDT corresponds to the estimated remaining video duration time.

The estimated remaining video duration time may be used to determine the estimated remaining video file size. In accordance with an embodiment, the estimated remaining video file size may be determined in accordance with Equation 7, which is shown below:

$$\text{ER VFS} = \text{TOTAL VFS} - \text{TOTAL VFS Downloaded} \quad \text{(Equation 7)}$$

where ER VFS corresponds to the estimated remaining video file size.

Finally, the minimum required bit rate required to transmit the remaining portions of the video content with a reasonable QoE may be determined based on the estimated remaining video duration time and the estimated remaining video file size. In accordance with an embodiment, the minimum required bit rate may be determined in accordance with Equation 8, which is shown below:

$$MRBR = \text{ER VFS} / \text{ER VDT} \quad \text{(Equation 8)}$$

where MRBR corresponds to the minimum required bit rate.

QoE improvement application 1132 also determines a short term average download rate (STADR), which corresponds to the number of bytes that were downloaded to video buffer 1136 in a first predetermined time period (e.g., 5 seconds) divided by the first predetermined time period. QoE improvement application 1132 may also determine a medium term average download rate (MTADR), which corresponds to the number of bytes downloaded to video buffer 1136 in a second predetermined time period that is greater than the first predetermined time period (e.g., 20 seconds) divided by the second predetermined time period. QoE improvement application 1132 may further determine a long term average download rate (LTADR), which corresponds to the number of bytes downloaded to video buffer 1136 in a third predetermined time period that is greater than the second predetermined time period (e.g., 60 seconds) divided by the third predetermined time period.

QoE improvement application 1132 may periodically determine (e.g., every 5 seconds) the above-described parameters (i.e., the STADR, MTADR, LTADR, TOTAL VFS, TOTAL VDT, TOTAL VFDS Downloaded, ER VFDS, ER VDT and MRBR) while the video content is being downloaded into video buffer 1136 and/or played back by video player application 1134 and maintains a history of the parameters as they may or may not have changed during each periodic cycle.

To determine whether the MRBR should be increased, QoE improvement application 1132 may determine whether the last N number of STADRs (e.g., the last four STADRs) that were determined are less than the most current MRBR. If QoE improvement application 1132 determines that the last N number of MTADRs are less than the MRBR, this means that the QoE cannot be guaranteed. Thus, QoE improvement application 1132 requests application function 1108 to increase the bandwidth. For example, QoE improvement application 1132 may request that the bandwidth be increased to twice the MRBR (i.e., 2*MRBR). If QoE improvement application 1132 determines that the last N number of MTADRs are greater than or equal to the most current MRBR, QoE improvement application 1132 determines that the download speed is higher than expected, and thus, requests that the current bandwidth be increased. For example, QoE improvement application 1132 may request that the bandwidth be increased to twice the MTADR. It is noted that in certain embodiments, QoE improvement application 1132 may determine that the MRBR should be increased by determining whether the last N number of MTADRs or LTADRs are less than the most current MRBR.

When requesting an increase in the bandwidth, user equipment 1102 may provide a request to application function 1108 to modify the QoE such that the remaining portions of the video content are provided at the bandwidth determined by user equipment 1102. The request may include an identifier of user equipment 1102 (e.g., an MSISDN) and the determined bandwidth. The request may be addressed to and provided to application function 1108 via eNodeB 1112, S-GW 1114 and second switch 1122. In response to receiving the request, application function 1108 generates a policy control rule for user equipment 1102 (using the MSISDN) based on the requested bandwidth indicated in the request. Application function 1108 updates PCRF 1126 with the generated policy control rule, and PCEF 1128 enforces the policy control rule such that the remaining portions of the video content are provided to user equipment 1102 at the requested bandwidth.

Thereafter, QoE improvement logic 1132 monitors video buffer 1136 to determine whether an underflow condition or an overflow condition exists. An underflow condition exists when the difference between the read pointer and the write pointer of video buffer 1136 represents that less than a first predetermined portion of the total capacity of video buffer 1136 (e.g., less than 10% of the total capacity of video buffer 1136) is occupied and there are video file(s) that have yet to be fully downloaded into video buffer 1136. An overflow condition exists when the difference between the read pointer and the write pointer of video buffer 1136 represents that greater than a second predetermined portion of the total capacity of video buffer 1136 (e.g., greater than 90% of the total capacity of video buffer 1136) video file(s) is occupied and there are video file(s) that have yet to be fully downloaded into video buffer 1136.

When an underflow condition has been detected, this means that the readout rate from video buffer 1136 (i.e., the rate at which video player application 1136 reads the video file(s) out from video buffer 1136) is higher than the rate at which video content provided by content provider 1106 is written into video buffer 1136. If an underflow condition persists, video buffer 1136 will eventually become empty, video player application 1136 will have not video data to playback, and the QoE for the user will suffer. Thus, responsive to detecting an underflow condition, QoE improvement logic 1132 provides a request to application function 1108 to modify the bandwidth such that the remaining portions of the video content are provided at an increased bandwidth. In accordance with an embodiment, user equipment 1102 may display a visual indicator to inform the user that an underflow condition has occurred (or is about to occur).

When an overflow condition has been detected, this means that the rate at which video content provided by content provider 1106 is written into video buffer 1136 is too high or that the readout rate is too slow (e.g., the user may have paused the video, thereby preventing readout from video buffer 1136). If an overflow condition persists, the video buffer will eventually become full and the download of video content is halted. Thus, responsive to detecting an overflow condition, QoE improvement logic 1132 provides a request to application function 1108 to modify the bandwidth such that the remaining portions of the video content stream are provided at a decreased bandwidth. For example, QoE improvement logic 1132 may request that the bandwidth be decreased to the MRBR. In accordance with an embodiment, user equipment 1102 may display a visual indicator to inform the user that an overflow condition has occurred (or is about to occur).

As described above, if the size of video buffer 1136 allocated is less than a predetermined percentage of the determined total video file size (e.g., 25%), QoE improvement logic 1132, using video buffer 1136, may estimate the network conditions and determine a minimum recommended bit rate (i.e., the MRBR) at which remaining portions of the video content are provided to user equipment 1102. The MRBR may be determined in accordance with Equations 2-8 as described above. In such a situation, the MRBR is requested (rather than a higher speed) because only a limited amount (e.g., 25%) of the video content can be downloaded. Since the amount of the video content can be downloaded is limited, there is no need to download the video content stream at a higher speed; just the speed at which video viewing takes place (i.e., the MRBR) is sufficient.

In accordance with an embodiment, QoE improvement application 1132 may periodically provide (e.g., every 5 seconds) the above-described parameters (i.e., the STADR, MTADR, LTADR, TOTAL VFS, TOTAL VDT, TOTAL VFDS Downloaded, ER VFDS, ER VDT and MRBR) to application function 1108. QoE improvement logic 1110 may be configured to analyze these parameters to determine how the network conditions and download speed varied through the video session on a per user and/or regional basis. In this way, QoE improvement logic 1110 may attempt to modify (e.g., fine tune) the bandwidth allocated for user equipment 1102 to provide an optimal QoE.

It is noted that certain content providers (e.g., content provider 1106) do not want their content stored by user equipment (e.g., user equipment 1102) (e.g., to prevent piracy of the video content). To comply with the content providers' regulations, access (e.g., read access) to the video file(s) stored in video buffer 1136 may be limited to video player application 1134. Furthermore, all content stored in video buffer 1136 may be erased (e.g., overwritten with junk or random values) in response to: (i) either video player application 1134 or QoE improvement application 1132 being terminated (i.e., the user has closed either video player application 1134 or QoE improvement application 1132); (ii) expiration of a predetermined time period from when video player application 1134 was initiated (i.e., opened by the user); and/or (iii) upon completion of playback of the video content.

In accordance with an embodiment, before requesting video content from content provider 1106, QoE improvement application 1132 may obtain the manifest file from video player application 1134 and determine various characteristics. Such characteristics may include the video duration time of the video content and the size of the video content. QoE improvement application 1132 may provide this information to application function 1108 before requesting the video content. Application function 1108 may determine the preferred bandwidth using this information in accordance to the embodiments described in Subsection A. However, in this case, the preferred bandwidth is allocated before transmission of the video content. Allocating the preferred bandwidth before transmission of the video content ensures that each packet containing the video content is transmitted at the preferred bandwidth.

Figure 12:
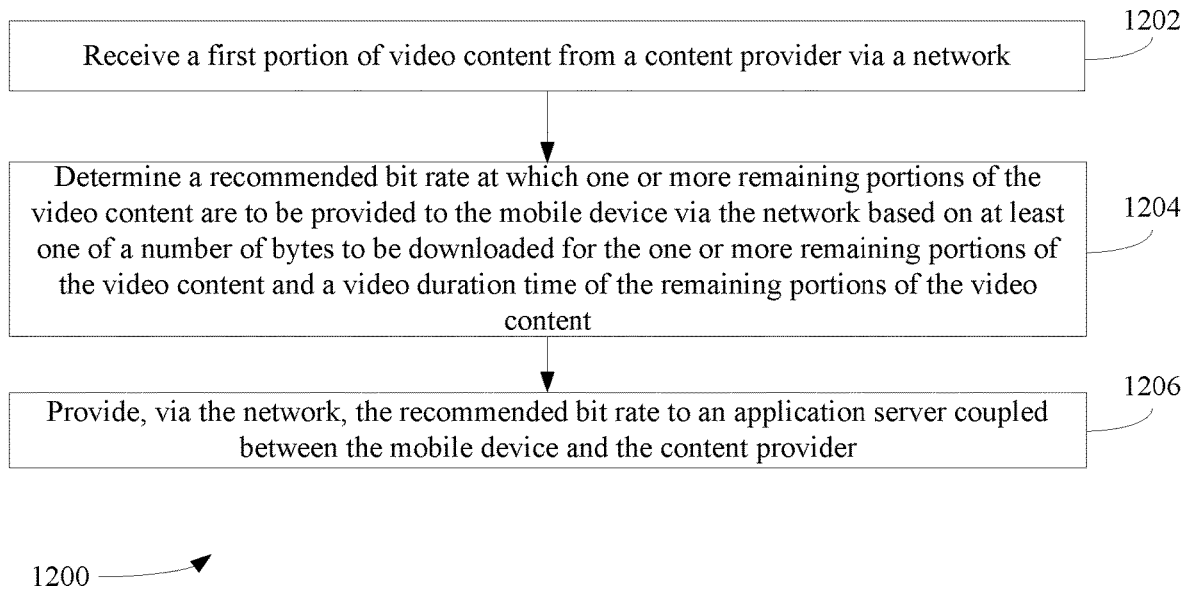
FIG. 12 depicts a flowchart of a method for providing an improved QoE for media content consumption when providing video content to user equipment via a communications network in accordance with an example embodiment.
Figure 13:
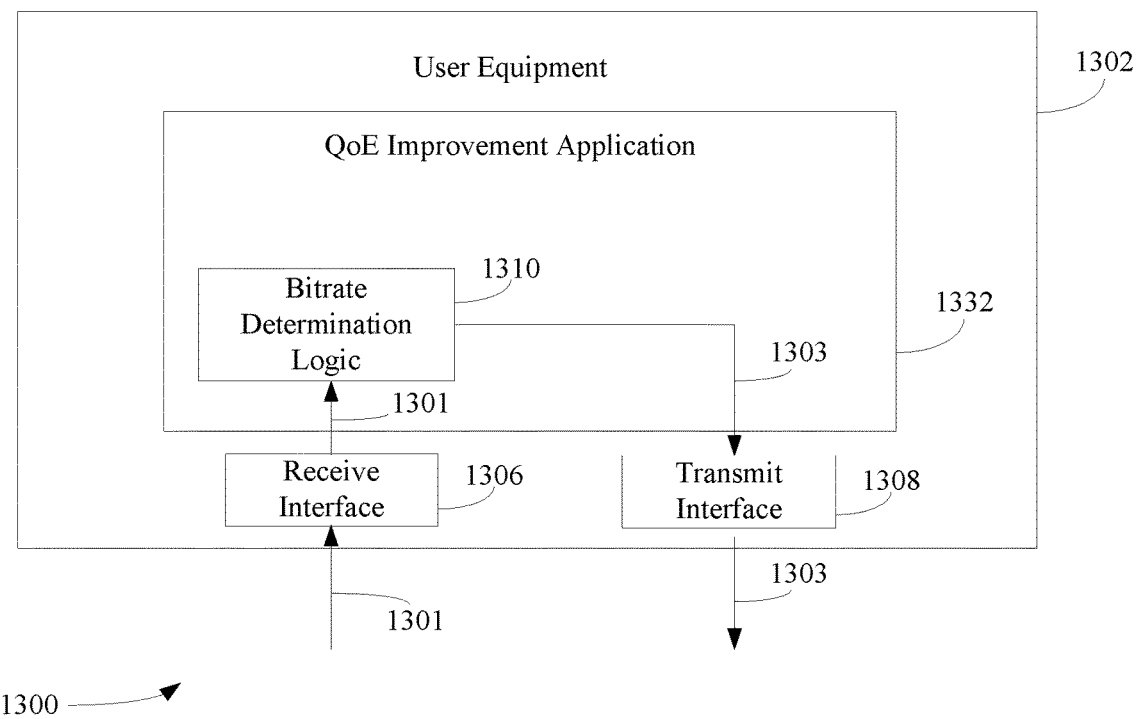
FIG. 13 shows a block diagram of user equipment in accordance with an example embodiment.

Accordingly, in embodiments, video content may be provided to user equipment with optimal QoE in various ways. For example, FIG. 12 depicts a flowchart 1200 of a method for providing an improved QoE for media content consumption when providing video content to user equipment via a communications network in accordance with an example embodiment. System 1100 as shown in FIG. 11 may operate according to flowchart 1200. For illustrative purposes, flowchart 1200 is described with reference to FIG. 12. FIG. 13 shows a block diagram 1200 of user equipment 1302 in accordance with an example embodiment. User equipment 1302 is an example of user equipment 1102, as shown in FIG. 11. As shown in FIG. 13, user equipment 1302 includes a receive interface 1306, a transmit interface 1308 and a QoE improvement application 1332. QoE improvement application 1332 includes bitrate determination logic 1310. QoE improvement application 1332 is an example of QoE improvement application 1132, as shown in FIG. 11. It is noted that while receive interface 1306 and transmit interface 1308 are shown as two different entities, receive interface 1306 and transmit interface 1308 may be a single entity. For example, receive interface 1306 and transmit interface 1308 may be implemented as a transceiver. Further structural and operational embodiments will be apparent to persons skilled in the relevant art(s) based on the discussion regarding flowchart 1200. Flowchart 1200 and user equipment 1302 are described as follows.

Flowchart 1200 begins with step 1202. At step 1202, a first portion of video content is received from a content provider via a network. For example, as shown in FIG. 13, receive interface 1306 receives a first portion 1301 of video content from a content provider (e.g., content provider 1106, as shown in FIG. 11) from a network (e.g., communications network 1104, as shown in FIG. 11). Receive interface 1306 provides first portion 1301 to bitrate determination logic 1310.

At step 1204, a recommended bit rate at which one or more remaining portions of the video content are to be provided to the mobile device via the network are determined based on a number of bytes to be downloaded for the remaining portion(s) of the video content and a video duration time of the remaining portion(s) of the video content. For example, as shown in FIG. 13, bitrate determination logic 1310 determines the recommended bit rate. The recommended bit rate may be determined in accordance with Equations 2-8, as described above.

At step 1206, the recommended bit rate is provided, via the network, to an application server coupled between the mobile device and the content provider. For example, as shown in FIG. 13, bitrate determination logic 1310 provides a recommended bit rate 1303 to transmit interface 1308, and transmit interface 1308 provides recommended bit rate 1303 to an application function (e.g., application function 1108, as shown in FIG. 11).

Figure 14:
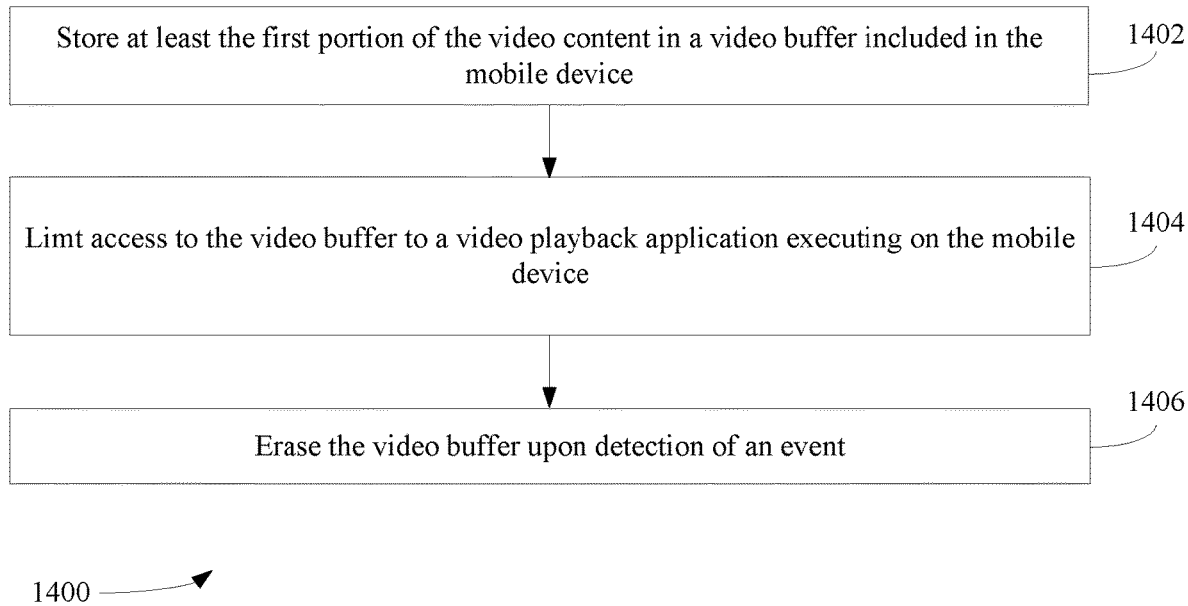
FIG. 14 depicts a flowchart of a method for storing a portion of video content in a video buffer of a mobile device in accordance with an example embodiment.
Figure 15:
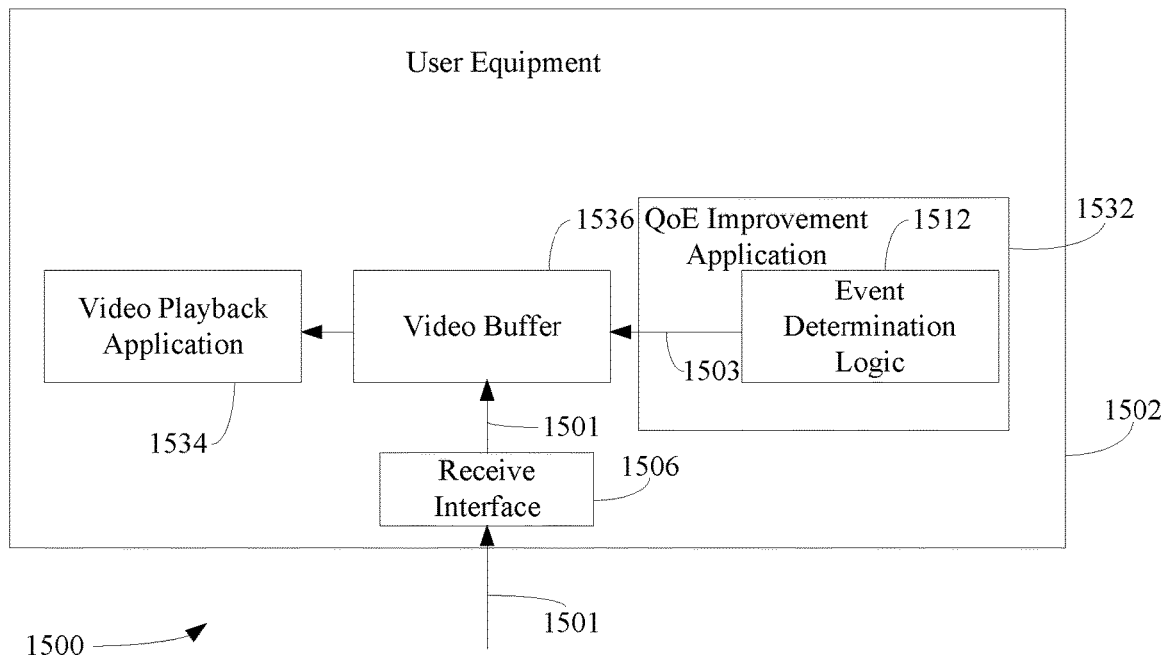
FIG. 15 shows a block diagram of user equipment in accordance with an example embodiment.

In accordance with one or more embodiments, at least the first portion of the video content may be stored in a video buffer of the mobile device. Accordingly, FIG. 14 depicts a flowchart 1400 of a method for storing a portion of video content in a video buffer of a mobile device in accordance with an example embodiment. System 1100 as shown in FIG. 11 may operate according to flowchart 1400. For illustrative purposes, flowchart 1400 is described with reference to FIG. 15. FIG. 15 shows a block diagram 1500 of user equipment 1502 in accordance with an example embodiment. User equipment 1502 is an example of user equipment 1302 as shown in FIG. 13. As shown in FIG. 15, user equipment 1502 includes a QoE improvement application 1532, a video playback application 1534, a video buffer 1536 and a receive interface 1506. QoE improvement application 1532, video playback application 1534 and video buffer 1536 are examples of QoE improvement application 1132, video playback application 1134 and video buffer 1136, as respectively shown in FIG. 11. Receive interface 1506 is an example of receive interface 1306, as shown in FIG. 13. QoE improvement application 1532 includes event determination logic 1512. Further structural and operational embodiments will be apparent to persons skilled in the relevant art(s) based on the discussion regarding flowchart 1400. Flowchart 1400 and user equipment 1502 of FIG. 15 are described as follows.

Flowchart 1400 begins with step 1402. At step 1402, at least the first portion of the video content is stored in a video buffer included in the mobile device. For example, as shown in FIG. 15, receive interface 1506 receives a first portion 1501 of video content and provides first portion 1501 to video buffer 1536.

At step 1404, access to the video buffer is limited to a video playback application executing on the mobile device. For example, as shown in FIG. 15, video buffer 1536 limits access (e.g., read access) to video playback application 1534.

At step 1406, the video buffer is erased upon detection of an event. For example, as shown in FIG. 15, event determination logic 1512 detects an event and sends a signal 1503 to video buffer 1536 that causes the contents of video buffer 1536 to be erased. For instance, signal 1303 may cause junk values to be written over all the content stored in video buffer 1536.

Figure 16:
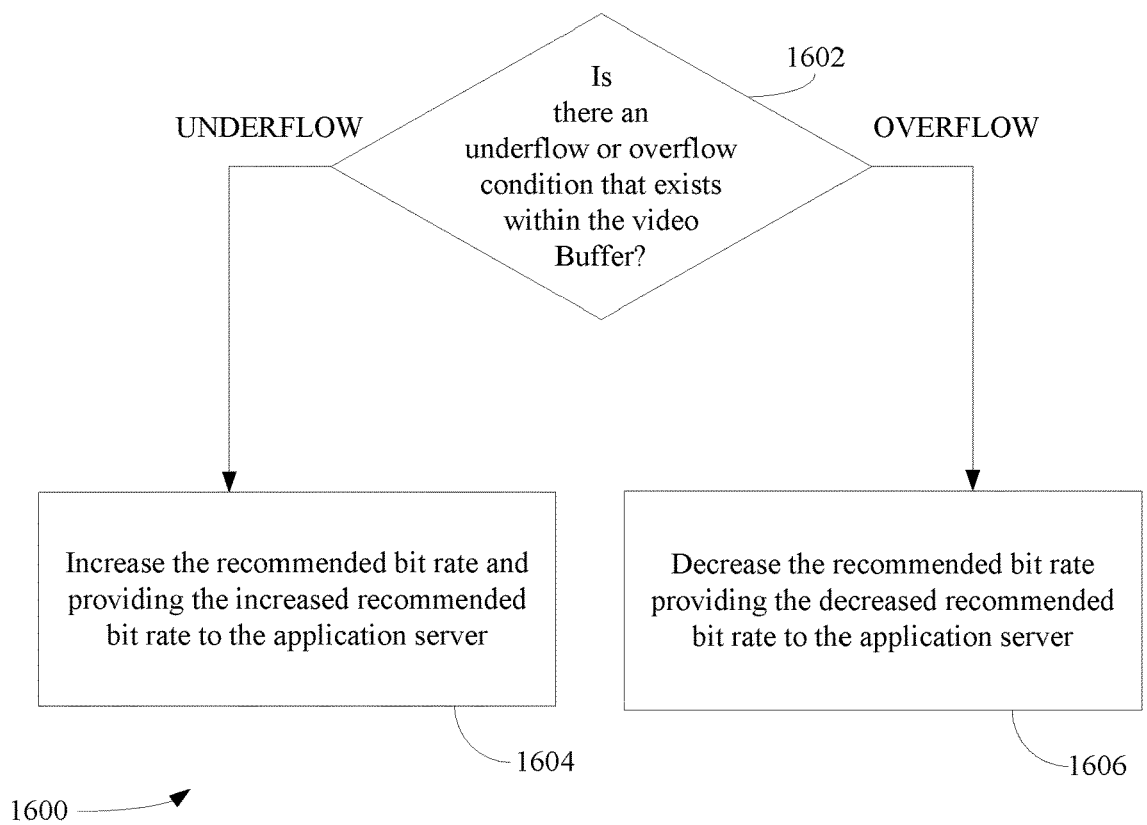
FIG. 16 depicts a flowchart of a method for updating a recommended bit rate based on whether an underflow condition or an overflow condition exists within a video buffer in accordance with an example embodiment.
Figure 17:
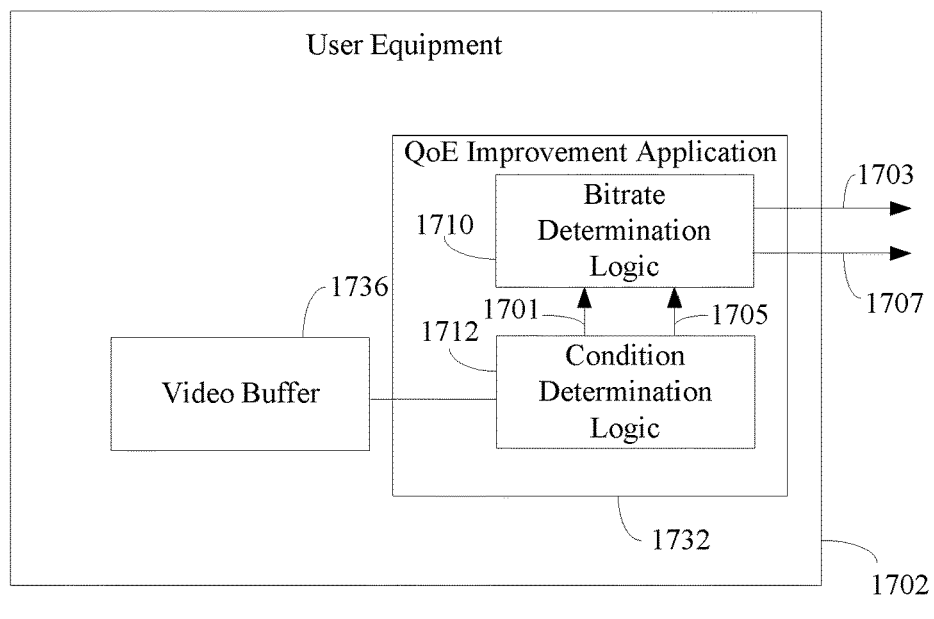
FIG. 17 shows a block diagram of user equipment in accordance with an example embodiment.

In accordance with one or more embodiments, the recommended bit rate may be updated based on whether an underflow condition or an overflow condition exits within the video buffer. Accordingly, FIG. 16 depicts a flowchart 1600 of a method for updating a recommended bit rate based on whether an underflow condition or an overflow condition exits within a video buffer in accordance with an example embodiment. System 1100 as shown in FIG. 11 may operate according to flowchart 1600. For illustrative purposes, flowchart 1600 is described with reference to FIG. 17. FIG. 17 shows a block diagram 1700 of user equipment 1702 in accordance with an example embodiment. User equipment 1702 is an example of user equipment 1502 as shown in FIG. 15. As shown in FIG. 17, user equipment 1702 includes a QoE improvement application 1732 and a video buffer 1536. QoE improvement application 1732 and video buffer 1736 are examples of QoE improvement application 1532 and video buffer 1536, as respectively shown in FIG. 15. QoE improvement application 1732 includes bitrate determination logic 1710 and condition determination logic 1712. Further structural and operational embodiments will be apparent to persons skilled in the relevant art(s) based on the discussion regarding flowchart 1600. Flowchart 1600 and user equipment 1702 of FIG. 17 are described as follows.

Flowchart 1600 begins with step 1602. At step 1602, a determination is made as to whether an underflow condition or an overflow condition exists within the video buffer. For example, as shown in FIG. 17, condition determination logic 1712 analyzes video buffer 1736 to determine whether an underflow condition or an overflow condition exists. If an underflow condition exists, flow continues to step 1604. If an overflow condition exits, flow continues to step 1606.

At step 1604, the recommended bit rate is increased and the increased recommended bit rate is provided to the application server. For example, as shown in FIG. 17, upon determining that an underflow condition exits, condition determination logic 1712 provides a signal 1701 to bitrate determination logic 1710 that indicates that an underflow condition exists within video buffer 1736. In response, bitrate determination logic 1710 increases the recommended bit rate and provides the increased recommended bit rate (i.e., increased recommended bit rate 1703) to the application function (e.g., application function 1108).

At step 1606, the recommended bit rate is decreased and the decreased recommended bit rate is provided to the application server. For example, as shown in FIG. 17, upon determining that an overflow condition exits, condition determination logic 1712 provides a signal 1705 to bitrate determination logic 1710 that indicates that an overflow condition exists within video buffer 1736. In response, bitrate determination logic 1710 decreases the recommended bit rate and provides the decreased recommended bit rate (i.e., decreased recommended bit rate 1707) to the application function (e.g., application function 1108).

Further Example Embodiments

A device, as defined herein, is a machine or manufacture as defined by 35 U.S.C. § 101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, infrared and other wireless media. Example embodiments are also directed to such communication media.

The determination of optimal QoE and/or the provision of media content with optimal QoE embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 18:
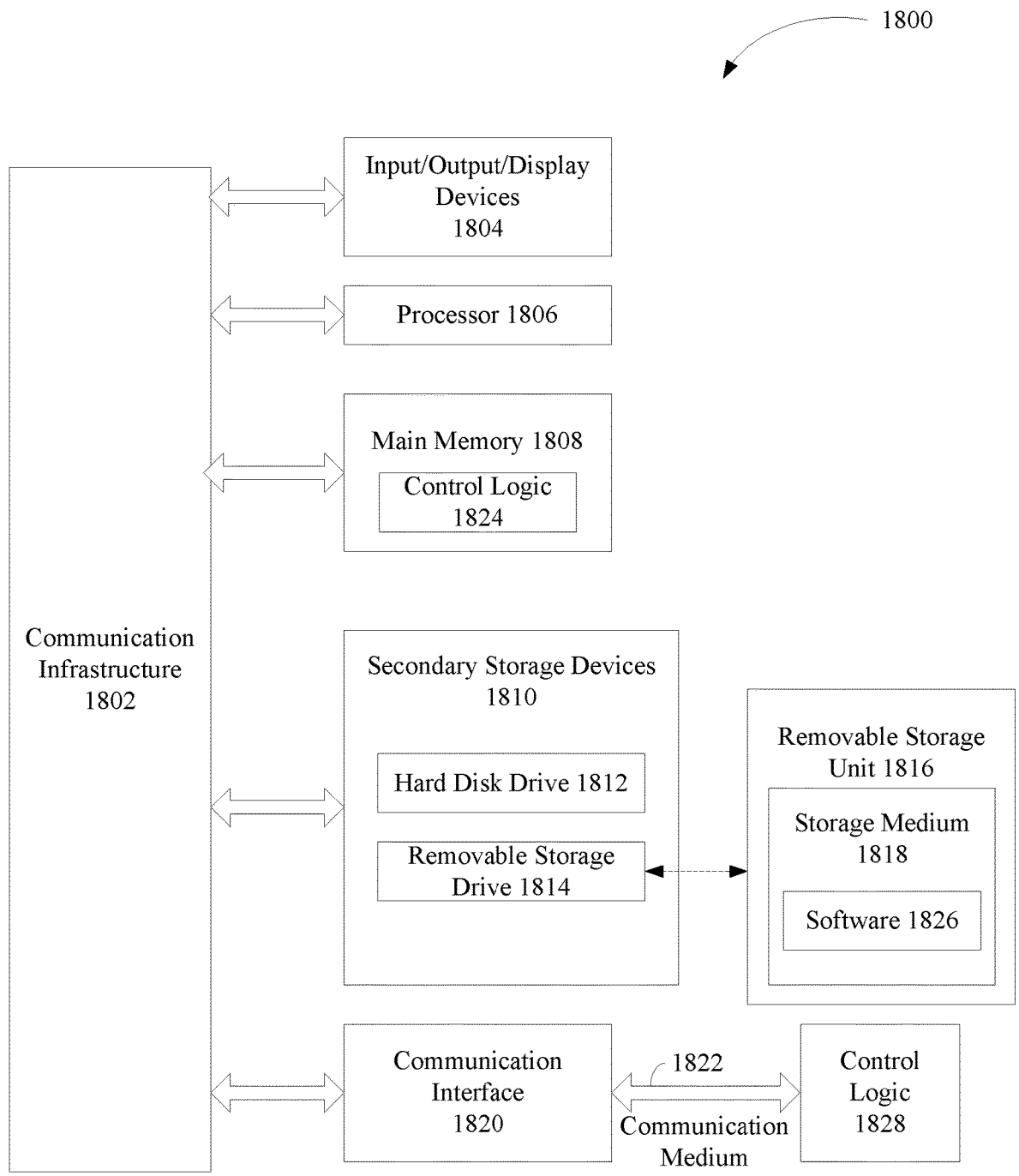
FIG. 18 is a block diagram of a computer system in accordance with an example embodiment.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 1800 shown in FIG. 18. It should be noted that computer 1800 may represent communication devices, processing devices, servers, and/or traditional computers in one or more embodiments. For example, user equipment 102, user equipment 202, user equipment 1102, user equipment 1302, user equipment 1502 and/or user equipment 1702 (as described above with reference to FIGS. 1, 2, 11, 13, 15 and 17, respectively), application function 108, application function 208, application function 408, application function 808, application function 1008 and/or application function 1108 (as described above with reference to FIGS. 1, 2, 4, 6, 8, 10 and 11, respectively), content provider 106, content provider 206 and/or content provider 1106 (as described above with reference to FIGS. 1, 2 and 11, respectively), NI logic 220, NI logic 820 and/or NI logic 1120 (as described above in reference to FIGS. 1, 8 and 11, respectively), communications network 104, communications network 204 and/or communications network 1104 (as describe above with reference to FIGS. 1, 2 and 11) and/or any of the sub-systems, components or sub-components respectively contained therein, may be implemented using one or more computers 1800.

Computer 1800 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1400 may be any type of computer, including a desktop computer, a server, etc.

Computer 1800 includes one or more processors (also called central processing units, or CPUs), such as a processor 1806. Processor 1806 is connected to a communication infrastructure 1802, such as a communication bus. In some embodiments, processor 1806 can simultaneously operate multiple computing threads.

Computer 1800 also includes a primary or main memory 1808, such as random access memory (RAM). Main memory 1808 has stored therein control logic 1824 (computer software), and data.

Computer 1800 also includes one or more secondary storage devices 1810. Secondary storage devices 1810 include, for example, a hard disk drive 1812 and/or a removable storage device or drive 1814, as well as other types of storage devices, such as memory cards and memory sticks. For instance, computer 1800 may include an industry standard interface, such a universal serial bus (USB) interface for interfacing with devices such as a memory stick. Removable storage drive 1814 represents a floppy disk drive, a magnetic tape drive, a compact disk drive, an optical storage device, tape backup, etc.

Removable storage drive 1814 interacts with a removable storage unit 1816. Removable storage unit 1816 includes a computer useable or readable storage medium 1818 having stored therein computer software 1826 (control logic) and/or data. Removable storage unit 1816 represents a floppy disk, magnetic tape, compact disk, DVD, optical storage disk, or any other computer data storage device. Removable storage drive 1814 reads from and/or writes to removable storage unit 1816 in a well-known manner.

Computer 1800 also includes input/output/display devices 1804, such as touchscreens, LED and LCD displays, monitors, keyboards, pointing devices, etc.

Computer 1800 further includes a communication or network interface 1818. Communication interface 1820 enables computer 1800 to communicate with remote devices. For example, communication interface 1820 allows computer 1800 to communicate over communication networks or mediums 1822 (representing a form of a computer useable or readable medium), such as LANs, WANs, the Internet, etc. Network interface 1820 may interface with remote sites or networks via wired or wireless connections.

Control logic 1828 may be transmitted to and from computer 1800 via the communication medium 1822.

Any apparatus or manufacture comprising a computer useable or readable medium having control logic (software) stored therein is referred to herein as a computer program product or program storage device. This includes, but is not limited to, computer 1800, main memory 1808, secondary storage devices 1810, and removable storage unit 1816. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

Additional Example Embodiments

The foregoing described components of system 100 and/or system 1100 (as respectively shown in FIGS. 1 and 11) may be implemented as a non-virtualized solution (e.g., using server(s) or computing device(s), such as a black or rack server architecture) or a virtualized solution. In accordance with an embodiment in which a virtualized platform is being used, the components may comprise policy detection and application logic, house-keeping logic, web portal logic, operator graphical user interface (GUI) logic and/or steering logic.

The policy detection and application logic may comprise the core intelligence and computing of the communications network. The policy detection and application logic may comprise a decision engine that is configured to decide whether a service (e.g., a video content providing service) can be offered or be denied. The decision engine may receive input (e.g., a request) from a service requesting entity (e.g., one or more services associated with the content provider (e.g., content provider 206 and/or content provider 1106, as respectively shown in FIGS. 2 and 11), compare the request with the service policies/constraints provisioned by both the operator of the communications network (e.g., the MNO of the communications network and the content provider, and provide the decision about policy level feasibility. Based on the policy level feasibility, the application function (e.g., application function 108, application function 208, application function 408, application function 608, application function 808, application function 1008 and/or application function 1108, as respectfully shown in FIGS. 1, 2, 4, 6, 7, 10 and 11) initiates a service request to the PCRF (e.g., PCRF 226 or PCRF 1126, as respectively shown in FIGS. 2 and 11). This advantageously provides value added service creation/modification/deletion (among other service management operations) and also creates records related to the service's data consumption, denials, service creation issues, etc.

The house-keeping logic may comprise middleware that implements one or more services, such as a command line interface (CLI), logger services, a Simple Network Management Protocol (SNMP) agent and its associated adaption layer, High Availability (HA) functions and a Management & Orchestration (MANO) interface. These services may be used in functional logic such as the steering logic, the policy decision and application logic, etc. The foregoing may be deployed as a VNF (Virtual Network Function) in one or more VMs (Virtual Machines), with each VM having at least one VNFC (Virtual Network Function Component). This VNFC may comprise two or more the policy detection and application logic, the web portal logic, the operator GUI logic and/or the steering logic.

The web portal logic may be configured to present required information to the MNOs, to which the application function is connected. The web portal logic may provide web-based interfaces and functionalities for all those entities/persons other than user/operator of the application function, providing multiple ways for MNOs to state their tariff and related rules, monitor issues relating to services offered by the PCRF and other network elements. The web portal logic may also support many analytics relating to video service and billing. For example, the duration in which the preferred bandwidth is allocated may be metered (noting the beginning and end times of the duration), the data usage of the user equipment (e.g., user equipment 202 and/or user equipment 1102, as respectively shown in FIGS. 2 and 11) may be calculated, and information associated indicative of the data usage may be securely displayed to the content provider, the MNO and/or other entities (e.g., the content distributor). The displayed web portal may also be used for commercial billing of the user of user equipment 202 by the MNO, the content provider and/or the content distributor. For example, the displayed web portal may be used as an electronic commerce (e-commerce) portal for the MNO, the content provider and/or the content distributor.

The operator GUI logic may be configured to enable the content distributor or content provider to configure the web portal logic dynamically for their needs. This function may provide the web based interface and GUI to the users, which may comprise an Element Management System (EMS) for Fault, Configuration, Accounting, Performance, and Security (FCAPS) functionality, web pages to provision the system with business policies, a plurality of dash boards to analyze application generated data (relating to service offerings) and billing information.

The steering block may be configured to route incoming packets to the destination as commanded by the policy decision and application logic. The steering block may be a collection of protocol interfaces and their end-point (including, but not limited to DIAMETER-based state-machines (such as Rx, Gx and/or REST interfaces). Messages transmitted in accordance with the protocol interfaces may be sent to an applications layer or any other above-described functional block. This mapping between protocol messages and functional blocks may be controlled by an internal message routing entity and the above-described functional blocks, which may be designed to receive/send generic messages. Hence, the steering logic may provide an adaptation function along with the mapping function.

The virtualized platform described above may be configured to executed on a computer (e.g., computer 1800). Such a platform may be cost-optimized by using virtualization, orchestration and/or containerization techniques. The containerization techniques may be multi-level orchestration techniques.

CONCLUSION

While various embodiments have been described above, it should be understood that they have been presented by way of example only, and not limitation. It will be apparent to persons skilled in the relevant art(s) that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method implemented by a device intermediate to a mobile device and a content provider, the device, the mobile device, and the content provider being communicatively coupled via a communications network, comprising:

receiving, by the intermediate device, a request for video content from the mobile device;

providing, by the intermediate device, the request to the content provider;

receiving, by the intermediate device, a trigger message from the content provider;

determining, by the intermediate device, whether the trigger message includes information regarding the video content;
in response to determining that the trigger message includes the information;
determining, by the intermediate device, a first bandwidth at which the video content is to be provided to the mobile device based on the information;
generating a policy control rule in accordance with the determined first bandwidth; and
associating the policy control rule with an identifier from the trigger message, the identifier being associated with the mobile device; and
in response to determining that the trigger message does not include the information, determining, by the intermediate device, a second bandwidth at which the video content is to be provided to the mobile device, the second bandwidth being a default bandwidth.

2. The method of claim 1, wherein the information includes the duration of the video content and the size of the video content.

3. The method of claim 1, further comprising:
in response to determining that the trigger message includes the information:
updating a control function of the communications network with the policy control rule.

4. The method of claim 3, wherein the control function is a Policy and Charging Rules Function.

5. The method of claim 1, wherein associating the policy control rule with the identifier comprises:
determining whether the trigger message comprises a first identifier associated with the mobile device;
in response to determining that the request for the video content does not comprise the first identifier:
obtaining a second identifier associated with the mobile device from the trigger message; and
obtaining the first identifier based on the second identifier, the first identifier being the identifier associated with the policy control rule;
in response to determining that the trigger message comprises the first identifier, using the first identifier as the identifier that is associated with the policy control rule.

6. The method of claim 5, wherein the first identifier is a Mobile Station International Subscriber Directory Number (MSISDN) associated with the mobile device and wherein the second identifier is an internet protocol (IP) based identifier associated with the mobile device.

7. The method of claim 1, wherein providing the request to the content provider comprises:
determining that the request is encrypted;
obtaining a certificate;
decrypting the request in accordance with the certificate;
including a first identifier associated with the mobile device in the decrypted request; and
encrypting the decrypted request.

8. The method of claim 7, wherein including the first identifier associated with the mobile device in the decrypted request comprises including the first identifier associated with the mobile device in a header portion of the decrypted request.

9. A computing device, comprising:
one or more processing units; and
a memory coupled to the one or more processing units, the memory storing instructions, which, when executed by the one or more processing units, cause the one or more processing units to perform operations, the operations comprising:
receiving, via a mobile network, a request for video content from a mobile device;
providing the request to a content provider;
receiving, from the content provider, a trigger message;
determining whether the trigger message includes information regarding the video content;
in response to determining that the trigger message includes the information,
determining a first bandwidth at which the video content is to be provided to the mobile device based on the information;
generating a policy control rule in accordance with the determined first bandwidth; and
associating the policy control rule with an identifier from the trigger message, the identifier being associated with the mobile device; and
in response to determining that the trigger message does not include the information, determining a second bandwidth at which the video content is to be provided to the mobile device, the second bandwidth being a default bandwidth, the computing device being intermediate to the mobile device and the content provider.

10. The computing device of claim 9, wherein the information includes the duration of the video content and the size of the video content.

11. The computing device of claim 9, wherein the operations further comprise:
in response to determining that the trigger message includes the information:
updating a control function of the mobile network with the policy control rule.

12. The computing device stem of claim 11, wherein the control function is a Policy and Charging Rules Function.

13. The computing device of claim 9, wherein associating the policy control rule with the identifier comprises:
determining whether the trigger message comprises a first identifier associated with the mobile device;
in response to determining that the request for the video content does not comprise the first identifier:
obtaining a second identifier associated with the mobile device from the trigger message; and
obtaining the first identifier based on the second identifier, the first identifier being the identifier associated with the policy control rule;
in response to determining that the trigger message comprises the first identifier, using the first identifier as the identifier that is associated with the policy control rule.

14. The computing device of claim 13, wherein the first identifier is a Mobile Station International Subscriber Directory Number (MSISDN) associated with the mobile device and wherein the second identifier is an internet protocol (IP) based identifier associated with the mobile device.

15. The computing device of claim 9, wherein providing the request to the content provider comprises:
determining that the request is encrypted;
obtaining a certificate;
decrypting the request in accordance with the certificate;
including a first identifier associated with the mobile device in the decrypted request; and
encrypting the decrypted request.

16. The computing device of claim 15, wherein including the first identifier associated with the mobile device in the decrypted request comprises including the first identifier associated with the mobile device in a header portion of the decrypted request.

17. The method of claim 1, wherein the video content is provided in accordance with the determined first bandwidth or the determined second bandwidth regardless of a bandwidth specified by a subscription level to which a user of the mobile device subscribes.

18. The method of claim 1, wherein the video content is provided in accordance with the determined first bandwidth or the determined second bandwidth via at least one of:
a default bearer assigned to the mobile device; or
a dedicated bearer requested by the mobile device from an operator of the communications network.

19. The method of claim 5, wherein the second identifier is an external IP based identifier associated with the mobile device and wherein obtaining the first identifier based on the second identifier comprises:
providing at least the external IP based identifier to at least one of Network Address Translation (NAT) equipment coupled to the communications network or Network Intelligence equipment coupled to the NAT equipment; and
receiving, from at least one of the NAT equipment or the Network Intelligence equipment, the first identifier, wherein the first identifier is mapped to the external IP based identifier by at least one of the NAT equipment or the Network Intelligence equipment.

20. The method of claim 19, further comprising:
receiving, from at least one of the NAT equipment or the Network Intelligence equipment, an internal IP-based identifier associated with the mobile device.

21. The method of claim 1, further comprising:
setting a timer for a predetermined time period; and
ignoring subsequent requests received until expiration of the predetermined time period.

22. The method of claim 1, wherein a header portion of the request includes an MSISDN associated with the mobile device.

23. The computing device of claim 11, wherein the control function is a Policy Charging and Enforcement Function.

\* \* \* \* \*

UNITED STATES PATENT AND TRADEMARK OFFICE
CERTIFICATE OF CORRECTION

PATENT NO. : 10,554,718 B2
APPLICATION NO. : 15/385594
DATED : February 4, 2020
INVENTOR(S) : Anand Uppili et al.

Page 1 of 1

It is certified that error appears in the above-identified patent and that said Letters Patent is hereby corrected as shown below:

In the Claims

In Column 29, Line 5, in Claim 1, delete "information;" and insert -- information: --, therefor.

In Column 30, Line 34, in Claim 12, before "of" delete "stem".

Signed and Sealed this
Thirty-first Day of March, 2020

Andrei Iancu
*Director of the United States Patent and Trademark Office*